US012112318B2

(12) United States Patent
Goldstein

(10) Patent No.: US 12,112,318 B2
(45) Date of Patent: Oct. 8, 2024

(54) METHOD AND SYSTEM FOR DEFINING, CREATING, MANAGING, AND TRANSACTING MULTIPLE CLASSES OF DIGITAL OBJECTS

(71) Applicant: ZUZLab, Inc., Pittsburgh, PA (US)

(72) Inventor: Seth Copen Goldstein, Pittsburgh, PA (US)

(73) Assignee: ZUZLab, Inc., Pittsburgh, PA (US)

( * ) Notice: Subject to any disclaimer, the term of this patent is extended or adjusted under 35 U.S.C. 154(b) by 533 days.

(21) Appl. No.: 17/383,171

(22) Filed: Jul. 22, 2021

(65) Prior Publication Data
US 2022/0027896 A1    Jan. 27, 2022

Related U.S. Application Data

(60) Provisional application No. 63/064,130, filed on Aug. 11, 2020, provisional application No. 63/055,025, filed on Jul. 22, 2020.

(51) Int. Cl.
*G06Q 20/00* (2012.01)
*G06F 9/54* (2006.01)
(Continued)

(52) U.S. Cl.
CPC ........... *G06Q 20/3678* (2013.01); *G06F 9/54* (2013.01); *G06F 16/27* (2019.01); *G06Q 20/202* (2013.01);
(Continued)

(58) Field of Classification Search
CPC ............. G06Q 20/3678; G06Q 20/202; G06Q 20/389; G06Q 20/4037; G06Q 20/405;
(Continued)

(56) References Cited

U.S. PATENT DOCUMENTS 9,794,074 B2   10/2017  Toll et al.
9,818,092 B2   11/2017  Pennanen
(Continued)

FOREIGN PATENT DOCUMENTS

EP      3443517 A1     2/2019
JP    2007208518 A  *  8/2007   ............. H04L 47/10

OTHER PUBLICATIONS

Demyan, M., "Trustlines are the New IOU", Hacker Noon, Apr. 19, 2019 (17 pages).
(Continued)

*Primary Examiner* — Russell S Glass
(74) *Attorney, Agent, or Firm* — Fox Rothschild LLP

(57) ABSTRACT

A system that can transfer tokens of multiple classes from issuers to recipients is disclosed. The system generates class-specific token specification that include parameters that must be satisfied for the first user to acquire, from another user of the system, any token that is created according to the class-specific token specification. The system will save the records for each of the class-specific token specifications to a digital ledger that is accessible to users of the system. When a transfer request is received for a particular token, the system will execute a smart contract by (a) accessing the digital ledger to verify that a class-specific token specification exists which corresponds to the class of the particular token, and (b) in response to the verifying write, to the digital ledger, a first ledger entry that includes a record indicating that the amount of the particular token has been transferred to the recipient.

24 Claims, 12 Drawing Sheets

(51) Int. Cl.
  *G06F 16/27* (2019.01)
  *G06Q 20/20* (2012.01)
  *G06Q 20/36* (2012.01)
  *G06Q 20/38* (2012.01)
  *G06Q 20/40* (2012.01)

(52) U.S. Cl.
  CPC ....... *G06Q 20/389* (2013.01); *G06Q 20/4037* (2013.01); *G06Q 20/405* (2013.01); *G06Q 20/381* (2013.01); *G06Q 20/3829* (2013.01)

(58) Field of Classification Search
  CPC .. G06Q 20/381; G06Q 20/3829; G06Q 20/02; G06Q 20/065; G06Q 20/223; G06Q 20/3827; G06Q 20/401; G06Q 20/4016; G06F 9/54; G06F 16/27
  USPC .......................................................... 705/21
  See application file for complete search history.

(56) References Cited

U.S. PATENT DOCUMENTS

| | | |
|---|---|---|
| 9,825,931 B2 | 11/2017 | Johnsrud et al. |
| 9,830,580 B2 | 11/2017 | MacGregor et al. |
| 9,830,593 B2 | 11/2017 | Myers |
| 9,836,790 B2 | 12/2017 | Ronca et al. |
| 10,346,814 B2 | 7/2019 | Pennanen |
| 10,373,129 B1* | 8/2019 | James ...................... H04L 9/06 |
| 10,778,438 B2 | 9/2020 | Shi et al. |
| 10,902,389 B1 | 1/2021 | McNamara et al. |
| 10,902,416 B1 | 1/2021 | McNamara et al. |
| 10,936,580 B2 | 3/2021 | Shi et al. |
| 10,965,447 B1 | 3/2021 | Prokopenya et al. |
| 11,069,000 B1 | 7/2021 | Serrano et al. |
| 2013/0030941 A1 | 1/2013 | Meredith et al. |
| 2017/0005804 A1* | 1/2017 | Zinder .................. H04L 63/123 |
| 2017/0293912 A1* | 10/2017 | Furche .................. H04L 9/0894 |
| 2019/0080392 A1* | 3/2019 | Youb ................ G06Q 20/38215 |
| 2019/0164151 A1* | 5/2019 | Doney ...................... H04L 9/50 |
| 2019/0340689 A1* | 11/2019 | Gordon, III ....... G06Q 20/0658 |
| 2019/0347624 A1 | 11/2019 | Pustizzi |
| 2019/0370807 A1 | 12/2019 | Hu et al. |
| 2020/0044831 A1* | 2/2020 | Soundararajan .......... H04L 9/50 |
| 2020/0145214 A1* | 5/2020 | Linton .................. H04L 9/3218 |
| 2020/0242105 A1* | 7/2020 | Rich .................. H04L 67/1097 |
| 2020/0334752 A1* | 10/2020 | Doney ............... G06Q 20/3672 |
| 2020/0351093 A1* | 11/2020 | Madhuram .......... H04L 9/0819 |
| 2021/0217001 A1* | 7/2021 | Harrison ............. G06F 21/6218 |

OTHER PUBLICATIONS

Fugger, R., "Money as IOUs in a Social Trust Network and a Proposal for a Secure, Private, Decentralized Digital Currency Protocol", Oct. 16, 2020 (9 pages).

Stefanos, O. et al., "Trust Is Risk: a Decentralized Financial Trust Platform", (2017) (31 pages).

International Search Report and Written Opinion dated Oct. 31, 2021, for Application No. PCT/US2021/042803 (7 pages).

* cited by examiner

401

| | |
|---|---|
| SPEC ID | 6e8775305 |
| ISSUER ID | 41 |
| ISSUER NAME | --- |
| INTEREST RATE | 1.05 |
| INTEREST START | 15 JUN 2021 |
| # OF INT PAYMENTS | 0 |
| MATURITY DATE | 01 JAN 2022 |
| BUYBACKS | NOT ALLOWED |
| CREATED AT | 22 JUL 2020 |
| UPDATED AT | 22 JUL 2021 |
| ISSUED AT | 22 JUL 2021 |

MINT   DESTROY

FIG. 4

METHOD AND SYSTEM FOR DEFINING, CREATING, MANAGING, AND TRANSACTING MULTIPLE CLASSES OF DIGITAL OBJECTS

RELATED APPLICATIONS AND CLAIM OF PRIORITY

This patent document claims priority to: (i) U.S. Provisional Patent Application No. 63/055,025, filed Jul. 22, 2020; and (ii) U.S. Provisional Patent Application No. 63/064,130, filed Aug. 11, 2020. The disclosures of the priority applications are fully incorporated into this document by reference.

BACKGROUND

Accessible and fair lending markets are essential for an economy to work for everyone. Unfortunately, the systems available to support lending markets are ridden with issues that cause markets to include asymmetric information, imperfect competition, and systemic bias. Systems that are available to process digital payments encounter similar issues. This makes it difficult for small businesses, the unbanked and those who are marginalized or economically disadvantaged to obtain access to capital, or to engage in online transactions.

In recent years, new digital platforms for financial markets have arisen. These include microlending platforms and digital currency platforms. However, these platforms have technical issues that can hinder their acceptance in broader lending markets. The technical issues include a lack of security and/or transparency, complex user interfaces that make it difficult for users to navigate, and other issues. In addition, the systems typically facilitate only two-party transactions, and they cannot verify when certain parties apply a level of trust to certain other parties in multi-party transactions. They also do not adapt to existing technology platforms such point-of-sale systems, but instead require users to purchase additional software, hardware or both. Further, they do not offer cryptographically secure ways to support verification of the parties' identities in systems where the individual parties to a transaction are permitted to remain anonymous to each other.

Also, many digital transaction platforms are closed systems. While certain merchants may use point of sale systems that will accept a particular cryptocurrency or other digital token, the technical limitations of those systems do not enable them to create and issue their own distinct types of tokens, nor do they enable them to accept multiple kinds of other distinct tokens. Furthermore, transactions in today's gift card, lending, and payment systems are typically opaque. Part of this is due to technical security and data privacy requirements. Yet, it has been shown that when trust in a community increases so does wealth. More trust can be created when a system can transparently record and process digital transactions. Even more trust can be created when the system automatically enforces the rules between these transactions. However, systems do not currently exist that enable such transparency and automatic rule enforcement while maintaining both technical security and data privacy safeguards.

This document describes a novel solution to allow businesses and individuals to engage in digital transactions that avoids the technical issues described above.

SUMMARY

A system and method for transferring tokens from multiple issuers to multiple recipients is disclosed in this document. In various embodiments, the system includes a processor and a computer-readable medium containing programming instructions that are configured to instruct the processor execute smart contracts. When the system detects receipt, from each of various issuers via an application programming interface, of requests to generate a specification for a token class, then in response to each of the requests, the system will generate a record for a class-specific token specification. The record for each specification may include: (i) an identifier that is unique to the class-specific token specification; (ii) a maturity date, and (iii) at least one parameter that must be satisfied for the first user to acquire, from another user of the system, any token that is created according to the class-specific token specification. The system will save the records for each of the class-specific token specifications to a digital ledger that is accessible to users of the system. For each of the class-specific token specifications, the system will generate a token set of one or more tokens that conform to the class-specific token specification. When the system detects receipt, from a first user, of request to transfer a first token to a second user, and the transfer request includes a class of the first token, an amount of the first token, and an identifier for the second user, then in response to the transfer request the system will: (a) verify that a class-specific token specification exists for the class of the first token by accessing the digital ledger and locating a token specification that corresponds to the class of the first token; and (b) in response to the verifying, write a first ledger entry to the digital ledger, in which the first ledger entry includes a record indicating that the amount of the first token has been transferred to the second user.

In various embodiments, the system may provide each of the users of the system with a digital wallet application via which that user may access a digital wallet that is associated with that user. Each digital wallet will identify, for each token class for which the user holds tokens, an amount of tokens of that token class that the user holds. In addition, the system may, at any point in time, identify an amount of tokens of a specified class that any specified user holds by scanning the digital ledger to extract, from ledger entries indicating that the first user has received or generated tokens corresponding to the class of the first token, and calculating an amount of the tokens corresponding to the class of the first token that the first user currently holds. For example, the system may: (i) scan the digital ledger to extract first amounts from ledger entries indicating that the specified user has received or generated tokens of the specified class; (ii) scan the digital ledger to extract second amounts from ledger entries indicating that the specified user has received or generated tokens of the specified class; and (iii) calculate a sum of the first amounts, and deduct the second amounts from the sum, to yield the amount of tokens of the specified class that the specified user holds at that point in time. Alternatively, the system may confirm that the digital wallet of the first user holds the amount of the first token by accessing digital wallet data for the first user to identify an amount of the tokens corresponding to the class of the first token that the first user currently holds.

In some embodiments, when writing the first ledger entry to the digital ledger, the system may write one or more of the following to the digital ledger: (a) a trustline entry that indicates that the first user will accept the first token; or (b) a futureline entry that indicates that the first user will accept the first token after a specified future event. In such situations, a user who must accept a token of a particular class also may be required to accept any token of a class that is greater than the class of the first token.

In some embodiments, before writing the first ledger entry, the system may access the digital ledger to find a trustline entry which confirms that the second user will accept the first token.

In some embodiments, when the system detects receipt, from the second user, of a request to transfer a portion of the first token to a third user, wherein an amount of the portion is less than the amount of the first token, then in response to the request to transfer the system may write to the digital ledger a second ledger entry that includes the amount of the portion, the class of the first token, and the identifier of the third user.

In some embodiments, when the system detects receipt, from the first user, of a buyback request that comprises an amount of a token of a first class that the first user desires to re-acquire from other users, then in response to the buyback request the system may: (i) access the digital ledger to verify that a first class-specific token specification exists which corresponds to the first class of the first token; (ii) verify that the first token satisfies a parameter of the first class-specific token specification; (iii) scan the digital ledger to identify a set of users who hold tokens of the first class of the first token; and (iv) for each of the users of the set, write to the digital ledger a ledger entry that includes a portion of the amount of the first token that is being re-acquired from that user, the first class, and an identifier of the first user.

In some embodiments, when the system detects receipt, from the second user, of a request to redeem the amount of the first token, then in response to the request to redeem the system may: (i) access the digital ledger to verify that a class-specific token specification exists which corresponds to the class of the first token; (ii) extract, from the class-specific token specification, the parameter that must be satisfied for the first user to acquire the first token; and (iii) verify that the first token satisfies the parameter and, in response, write to the digital ledger a second ledger entry that includes the amount of the first token, the class of the first token, and an identifier of the first user.

In some embodiments, when the system detects of receipt of both (a) from a first issuer, an authorization to permit another user of the system to perform an operation with a new token according to a class-specific specification that is associated with the first issuer, wherein the authorization includes a maximum amount, and (b) from the other user, a request to perform the operation with the new token according to the first issuer's class-specific specification, along with an amount for the new token that is less than the maximum amount, then in response the system may write to the digital ledger a second ledger entry that includes the operation, the amount for the new token, the token class for the new token, and an identifier of the other user. The operation may include one or more of the following: mint the new token; transfer the new token; redeem the new token; execute a buyback transaction with the new token; or perform another operation.

In some embodiments, the processor that is configured to detect receipt, from the first user, of the transfer request is a processor of a point of sale terminal operated by the second user. If so, the processor that is configured to verify that the class-specific token specification exists and to write the first ledger entry to the digital ledger may be an application server that is in communication with the point of sale terminal by one or more networks.

In some embodiments, the system also may create and write to the digital ledger a digital ledger entry representing a conditional and multi-party transaction (CAMT). When the system then receives, from multiple of requesting users, requests to participate in the CAMT, then for any requesting user who is a valid requester the system will create a digital ledger entry indicating that the valid request is a participant in the CAMT. The system will also receive, from one or more of the participants, a request to transfer tokens of a specified class to the CAMT, and the system will write to the digital ledger a digital ledger entry with a record indicating that the tokens of the specified class have been transferred to the CAMT. Then, periodically the system will access the digital ledger entry to retrieve one or more conditions that will trigger execution of the CAMT. If the one or more conditions have been met and the conditions are expiration conditions, the system will expire the CAMT by writing digital ledger entries that reverse each participant's participation in the CAMT. If the one or more conditions have been met and are not expiration conditions, the system will execute the CAMT by writing digital ledger entries indicating that the tokens of the specified class are distributed from the CAMT to some or all of the participants.

BRIEF DESCRIPTION OF THE DRAWINGS

FIG. 4 illustrates an example user interface for creating new tokens from a user-defined token specification.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another and is not intended to require a sequential order unless specifically stated.

The term "approximately," when used in connection with a numeric value, is intended to include values that are close to, but not exactly, the number. For example, in some embodiments, the term "approximately" may include values that are within +/−10 percent of the value.

In this document, the term "token" refers to a digital representation of a unit of value. A token may be transferred between users, exchanged for value, divided into multiple tokens, and/or combined with other tokens into a new token of larger value. A "token specification" is a set of instructions and/or parameters that apply to tokens of a particular class. The term "token class" may be used to refer to the characteristics of tokens that are created according to a particular token specification.

Additional terms that are relevant to this disclosure will be defined at the end of this Detailed Description section.

Figure 1:
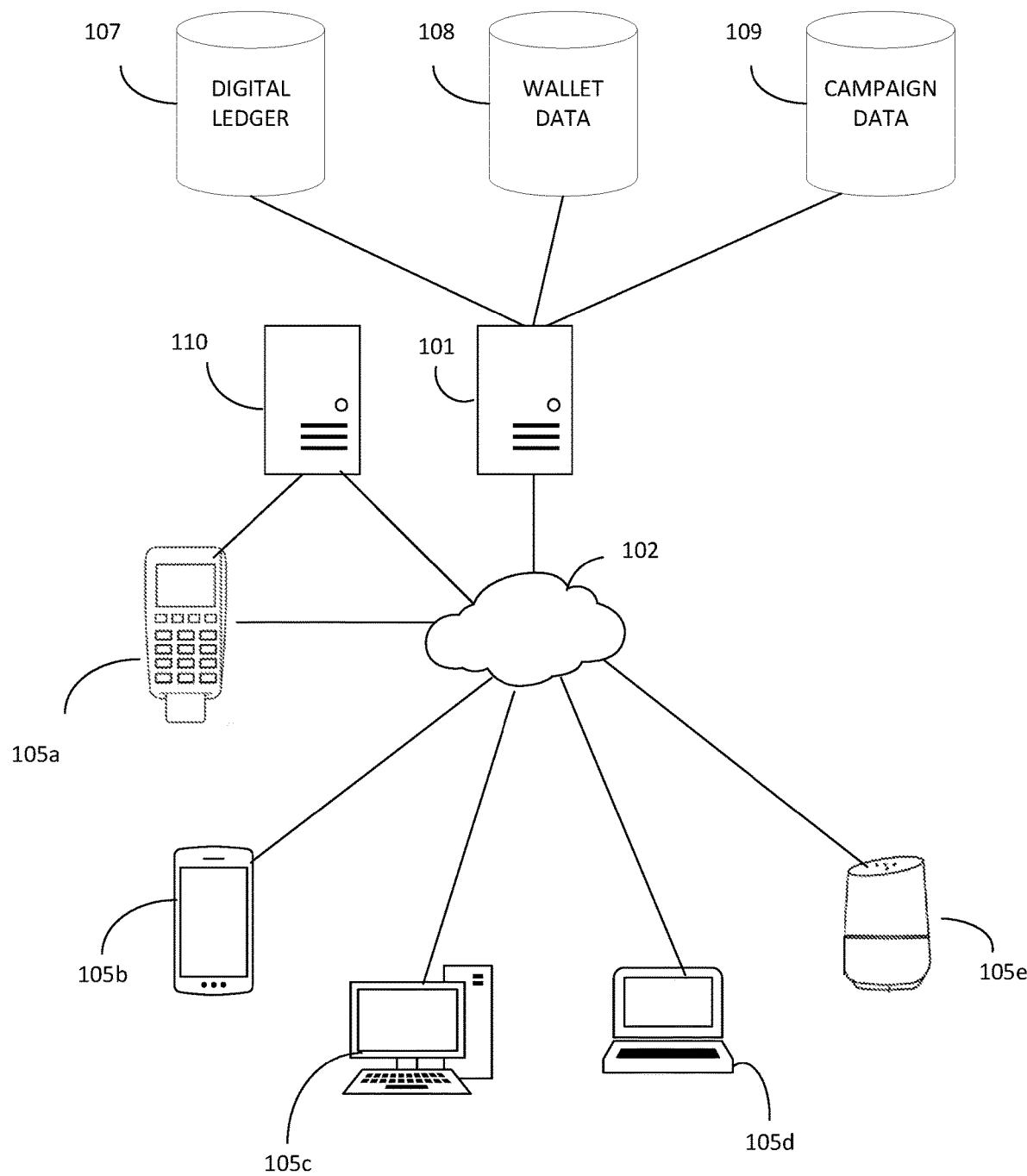
FIG. 1 illustrates a system via which multiple users can use electronic devices to implement exchanges for value in a digital transaction system.

FIG. 1 illustrates a system via which multiple users can use electronic devices to implement exchanges for value in a digital lending system. The system includes a server 101, which may be a single server or a network with any number of servers, each of which includes one or more processors that implement the lending platform. Any number of user electronic devices 105a . . . 105e can access the server 101 via one or more wired or wireless communication networks 102. The user electronic devices may include, for example, a point of sale (POS) terminal 105a, a smartphone or personal digital assistant device 105b, a desktop computer 105c, a laptop or tablet computer 105d, or an internet-connected smart home device 105e with an audio or other input such as a smart speaker or other Internet-of-Things-connected device. Each POS terminal 105a will be in electronic communication with a POS system server 110, which provides the POS terminal 105a with both general functions that are required to handle transactions for the merchant at which the POS terminal 105a is located, as well as functions in which the POS system server 110 secures data from and transfers data to external components of the system via server 101. The POS terminal 105a may communicate directly with its POS system server 110 via a local wired or wireless network, or via an external communications network 102.

The server 101 includes or is in communication with one or more digital ledgers 107. A digital ledger is a set of one or more data stores that allows simultaneous access, validation, and record updating in an immutable manner by multiple users. The digital ledgers 107 may be in a single, centralized data store or in a distributed, decentralized network of data stores, and they may be available for public review, or for private review by authorized users of the system. Any of the digital ledgers 107 may be a stand-alone system or one that is implemented on top of an existing layer 1 or layer 2 digital ledger system, such as by adding features to such an existing system.

The server 101 includes or is in communication with one or more memory devices that store digital wallets 108. Each digital wallet is a user-specific set of account data and/or other data, which data is accessible to that user by a digital wallet application which will be described in more detail below. As will be described below, the server 101 may provide digital wallet data for a particular user to the data store of digital wallets 108 when that user engages in a transaction on the system. In addition or alternatively, the server 101 may periodically scan the digital ledger 107 for ledger entries that identify the user, and thus the system may automatically build and/or update the digital wallet data 108 in real time at any time.

Optionally, the server 101 also may include or be in communication with one or more data stores of campaign information 109. Campaign information will include details that each issuer (described below) may include about the issuer's token specifications to share with potential buyers, lenders or others who may acquire tokens that conform to those specifications in exchange for assets of value. Example campaign information elements include informational descriptions, digital video files, audio files and other data that a potential token acquirer may access and use to consider whether or not to acquire tokens of a particular specification. The campaign information data store 109 may be one or more remote databases from which the server 101 serves information to a user's electronic device (such as 105b), where the user may access the campaign information using a digital wallet application, a browser, or other application on the device.

FIGS. 2A-2D illustrate a process flow of actions that the server 101 of a digital lending system such as that shown in FIG. 1 may implement. In the process, users may register with the system, and the system will then create a user ID for them, which it will record on a digital ledger. The user ID entry may or may not include information which is related to a real-world entity, such as a name, phone number or email address. The application communicates with a server which handles the verification, or the verification can require human intervention. Upon verification, the server will create a public/private key-pair. The private key is sent back to the user through the application or some other means of communication. The public key is sent to the ledger where it is recorded along with a unique user identifier. Alternatively, an authorized outside application can register a user via the server through a registration API which will create a public/private keypair, returning the private key as a response to the API request. As in the first case, the public key is sent to the ledger where it is recorded along with a unique user identifier. Finally, a public key can be directly registered on the ledger with a unique user identifier. Such a public key can be claimed by a user on the wallet application or through a server API by having the user sign a server generated nonce which is returned by the wallet or other the requesting application. In all cases, additional information can be stored with the user identity, if so desired.

Thus, the user ID on the ledger may either be the public key of a public/private key pair, or a key which the system can use to find the public key of the user. Every token specification will be associated with at least one of these user IDs on the digital ledger. Furthermore, the system provides a method which can be used to sign information (available on a web page, for example) with the user's private key. Thus, a token specification can, at the choice of the user, be tied to real world information which can be verified by other users on the system or not be tied to any such information. The system implements an application programming interface ("API") that allows an application to verify the campaign information behind a token specification, in particular, the real-world identity that is responsible for the token specification.

At 200 an issuer who is registered with the system (and who is referred to as User X in FIG. 2A) will use an electronic device operated to log into to the system, and the system will authenticate the user's device using processes such as those described above.

At 201 the system will receive, from the authenticated device of User X, will request to define a token specification for a token set. A token set is a group of digital objects (referred to in this document as tokens) that users of the system can exchange for goods, services or other items of value. The tokens may be used in payment transactions, lending arrangements and other exchanges of goods, services or other items of value. The request will include, at a minimum, a set of specifications for tokens in the token set. The token specification may include, for example, a starting value for the set, maturity date, an interest rate, and one or more buyback rules. The buyback rules are one or more conditions or other requirements that must be satisfied for the issuer to fulfill a request to re-acquire (by purchase or by another exchange for value) any of the issuer's tokens from subsequent recipients of the tokens. In situations where the buyback rules are satisfied, the system will require the issuer to re-acquire the tokens from a subsequent recipient of the token. The user may provide the specifications, the system may include one or more default or required specifications, or the specifications may include a combination of these.

At 202 the system will generate a record that includes a class-specific token specification, and at 203 the system will save the record class-specific token specification to a digital ledger. The class-specific token specification will be associated with a class that is unique to the issuer who requested the set, and it will include the specifications identified in step 201. For example, a specification that is requested by a first issuer ("issuer 1") will be assigned a first class (i.e., "class 1"), and a specification that is requested by a second issuer ("issuer 2") will be assigned a second class (i.e., "class 2"). The class need not personally identify the issuer; it need only be a code that is unique to the issuer. In this way, the system can provide security by allowing an issuer to remain anonymous to other users, and optionally even to the system operator. The system can later verify the issuer who returns to the system by sending the issuer a two-factor authentication message to a mobile number or email address, or by sending a checksum to the issuer's web page or authentication application to verify that an entity who claims to be the issuer is actually the authorized issuer.

In addition, an issuer is not necessarily limited to a single class; one issuer may be assigned multiple classes and thus create multiple class-specific token specifications.

The record for each class-specific token specification will include an identifier for the issuer, a class identifier of the issuer, and specifications that users and/or tokens must comply with in order to require the issuer to re-acquire a token from the user. The specifications may include specifications that the issuer provided, and/or specifications that the system assigns by default and/or by implementing various rules. For example, as described above each specification may include any or all of the following:

an identification code for the issuer;
one or more interest rate specifications such as daily compounding rate, as well as start and end dates for accumulation of interest;
one or more maturity specifications that, if satisfied, will commit the issuer to re-acquire any token (or a portion of a token, or a group of tokens) in the class-specific token set from a subsequent recipient, such as a maturity date, fees that are associated with maturity, and/or one or more redemption specifications such as information specifying the goods, services or currency that the issuer will provide to a presenter of a valid token; and
one or more buyback specifications that, if satisfied, will permit the issuer to re-acquire any token (or a portion of a token, or a group of tokens) in the class-specific token set from a subsequent recipient if the issuer chooses to do so. Example buyback specifications include confirmation of payment of a buyback fee, which is a fee that is required if the buyback option is executed. Example buyback specifications also may include the token class which will be exchanged for the token class that is being bought back.

Different token specifications may be associated with different currencies. Each token specification may include a field that indicates what the value of a single token is in an underlying currency (which may be a fiat currency such as U.S. dollars or European EUR, or a cryptocurrency like Ether). In each of the transactions described in this document, when the underlying currencies are the same the token transfer ratio may be 1:1. However, if the underlying currencies are not the same, then the system may automatically apply a conversion rate to determine the token transfer ratio so that one token of a particular currency will be exchanged with an equivalent value of tokens of a different currency. Thus, the system as described below enables transactions between not only different token specifications, but also different underlying currencies.

The specifications therefore create a smart contract in which the system will automatically execute the smart contract by performing, for example, a redemption process when a redemption request is presented (at 210). The redemption request is a request to redeem one or more tokens and will include, at a minimum, a class and a value for the token(s) to be transferred. To execute the smart contract, at 211 the system will automatically scan the digital ledger to determine whether token specification exists that matches the class identified in the redemption request. If a corresponding token specification exists (211: YES), then the system will parse the request and other data (such as calendar data, and other ledger entries) to confirm (at 212) that the redemption request satisfies the applicable redemption specifications. These steps will be described in more detail below in the context of FIG. 3. If the redemption request satisfies the applicable redemption specifications (212: YES), then the system will implement the redemption request and complete the transfer by writing a transfer record to the digital ledger at 213. If the specifications are not satisfied (212: NO), or if no corresponding specification exists (211: NO), then the system will not execute the redemption request.

The token class specifications can also include smart contracts which give the issuer of the token class the ability buyback any tokens of the class which are currently being held by other users on the system. The parameters of this smart contract can include, but are not limited to, a fee which is paid by the issuer to initiate the buyback as well as what tokens will be exchanged for the tokens being bought back. As described elsewhere in this document, the issuer can use tokens of a class greater than or equal to the tokens specified in the smart contract.

Figure 2A:
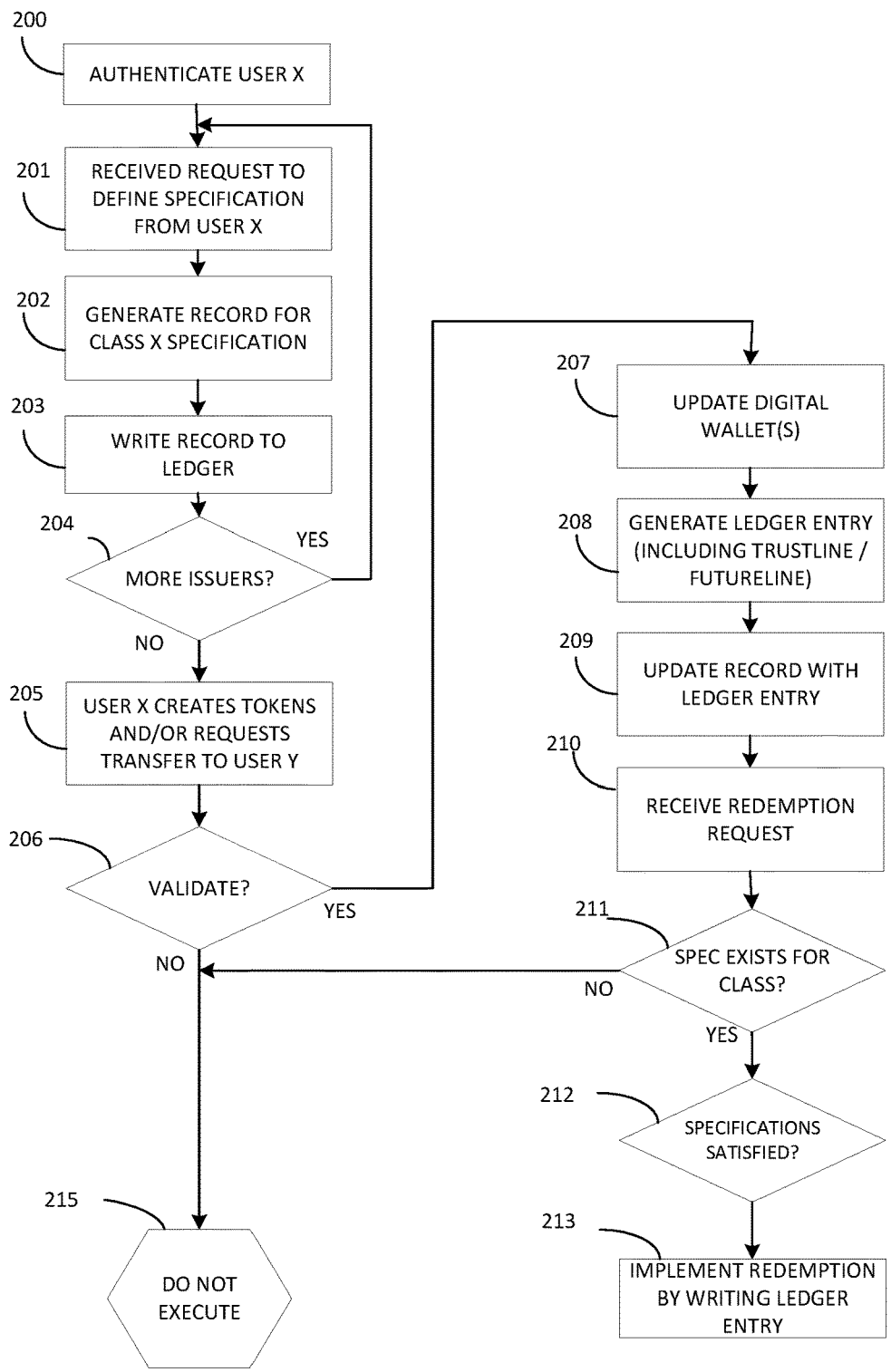
FIGS. 2A-2E present flowcharts illustrating steps that a digital transaction system may implement.
Figure 2B:
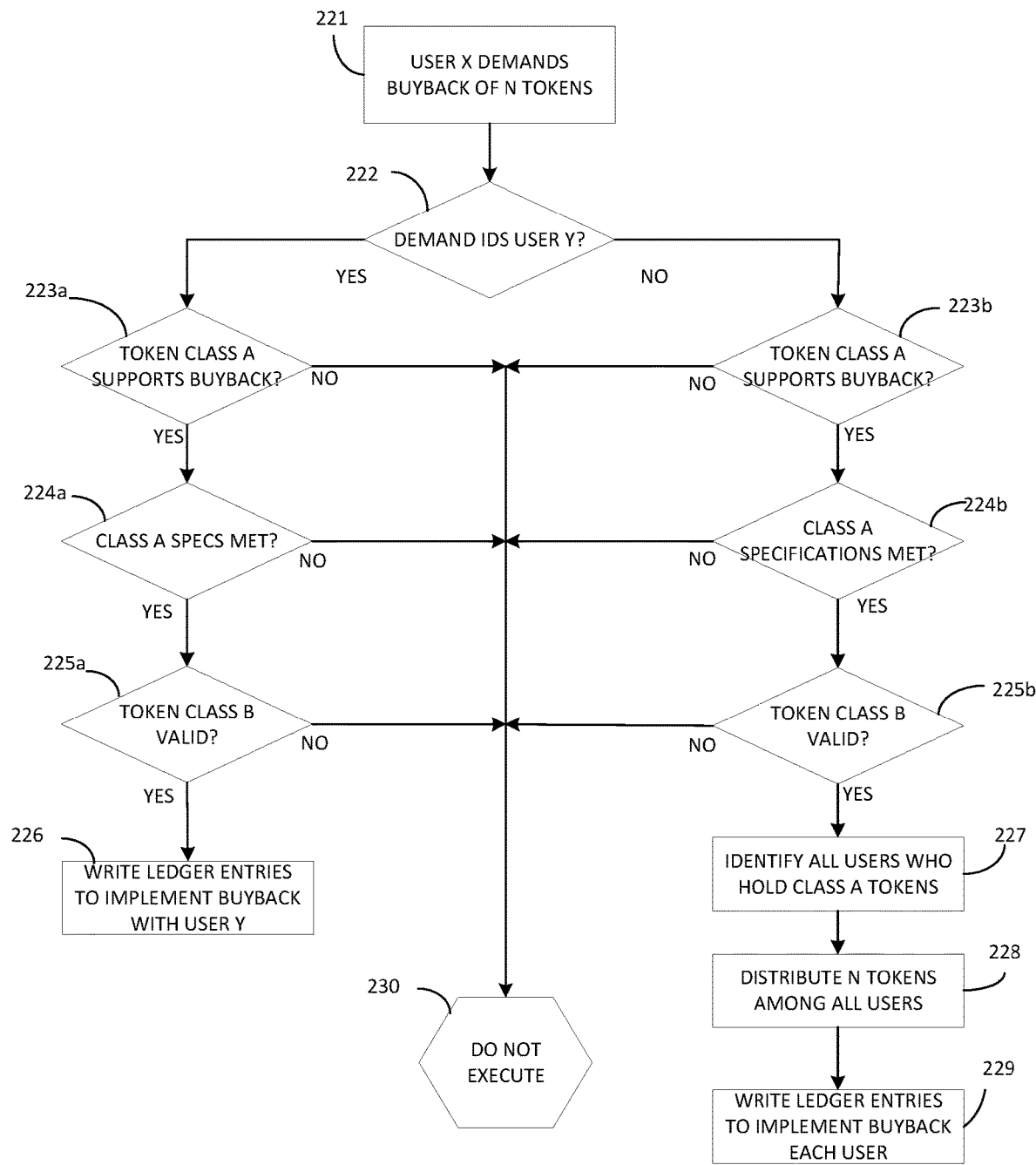

An example of this is illustrated in FIG. 2B, in which User X can call in (i.e., require redemption of) tokens that the User X has previously created and/or distributed to other users. This document refers to such a function as a "buyback transaction". This document refers to the specifications which, if satisfied, require transferees to return tokens to the transferor as "buyback specifications." Because User X may have transferred tokens to not only User Z but also other users, and each of User Z and the other recipients may have further transferred the tokens to other users, in most systems User X would not be able to have any idea who holds the tokens. Advantageously, the process described in FIG. 2B provides the technical function required to support buyback transactions.

Referring to FIG. 2B, at 221 the system will receive, from a first user (User X) a demand to buy back a number N of tokens of a first class (referred to here as Class A) in exchange for other items (such as N tokens of Class B). The demand may specify the user (or users) from whom the tokens are to be acquired. If so—for example, if the demand identifies User Y (222: YES), then the system will perform the following automated verifications. First, at 223*a* the system will verify that the tokens of Class A support buyback. The system may do this by scanning the digital ledger to extract the token specification for Class A tokens, and parsing those token specifications to determine whether they include buyback specifications. At 224*a* the system will examine those buyback specifications to determine whether they have been met. (For example, the system may determine whether the current date is past a buyback date in the buyback specification.) If the tokens of Class A do not support buyback (223*a*: NO) or if the buyback specifications for the tokens of class A have not been satisfied (224*a*: NO), then the system will not automatically execute the buyback transaction 230.

Optionally, at 225*a* the system also may determine whether the tokens of Class B are valid, such as by accessing the digital wallet of User X to confirm that User X holds the required amount of those tokens. Methods of doing this may include accessing wallet data or scanning the digital ledger to build wallet data, as will be described in more detail below. The required amount may be the number N of Class A tokens to be transferred, optionally plus an additional number of tokens to cover a transfer fee. If the tokens of Class A do not support buyback (223*a*: NO) or the tokens of class B are not valid (225*a*: NO), then the system will not execute the buyback transaction 230.

On the other hand, if the tokens of Class A does support buyback (223*a*: YES) and the buyback specifications for the tokens of class A have been satisfied (224*a*: YES), and (if applicable) the tokens Class B are valid (225*a*: YES), then the system will automatically execute the buyback transaction 226 by writing one or more digital ledger entries indicating that the number N of Class B tokens (optionally plus an additional number of Class B tokens to cover a transaction fee) have been transferred to User Y, and also indicating that the number N of Class A tokens have been transferred to User X.

In addition to executing a buyback between the issuer and another user holding the issuer's tokens, an issuer can execute a buyback operation for a percentage of tokens from every user holding the issuer's tokens. In this way the issuer can buyback a percentage of all outstanding tokens of a certain class. For example, returning to step 222 in FIG. 2B, if the demand did not identify a particular user but instead simply demanded a number of tokens (such as a percentage P of all outstanding class A tokens) (222: NO), then the system will determine whether the token Class A supports buyback 223*b*, whether the Class A buyback specifications have been met 224*b*, and optionally whether token Class B is valid 225*b* using procedures such as those described above for the process flow on the left side of FIG. 2B. If the determination of any of these steps is "no", then the system will not automatically execute the transaction 230. However, if the determination of all of these steps is "yes", then at 227 the system will automatically scan the ledger to identify all users who hold tokens of Class A. At 228 the system will then equally (or substantially equally) distribute the N tokens among each of the users who hold tokens of Class A. At 229 the system will automatically execute the buyback transaction by writing digital ledger entries for each identified user indicating that that user's portion of the Class A tokens have been transferred User X, and also indicating that a corresponding number of Class B tokens (optionally plus an additional number of Class B tokens to cover the transaction fee) have been transferred to the identified user.

An example record for a class-specific token specification may include a "create" ledger entry with information such as the following, in which the italicized words represent variables and the non-italicized words represent the kind of information that each variable represents:

Create: <address issuer, Array_of_Maturity maturity information, Array_of_Interest interest information, Buyback buyback information, Value limit>, in which the address is an identifier for the issuer;

the maturity information includes maturity specifications such as:

(a) a maturity date;

(b) a set of redemption specifications, each of which includes specifications such as (i) goods and services at a specific discount rate (which may default to, for example, 100%), (ii) an outside currency at a specific discount rate (which may default to, for example, 100%), (iii) a set of token specifications, each with their associated discount rate (which may default to, for example, 100%), and/or (iv) a percentage of the tokens held by the user to which this applies;

the interest information includes interest rate specifications such as (i) daily compounding rate (which may default to, for example, 0%), (ii) a start date for interest to begin accumulating, and/or (iii) an end date for interest rate to stop accumulating;

the buyback information includes buyback specifications such as (i) a fee to be paid if it is activated as a percentage of the tokens being bought back (which may default to, for example, 0%), (ii) the token specification that will be used to exchange this token, (iii) a discount rate to be applied (which may default to, for example, 100%), (iv) a start date (which may default to, for example, an issue date) after which this buyback can be activated; and the value is a limit which, if specified, indicates a maximum number (or maximum total value) of tokens that can be created in the applicable token class.

At 204 the process of steps 201-203 will repeat for any number of issuers. In addition, the system may continue to create new records at any time, even after later steps of this process have begun or been completed.

The digital ledger to which the system saves each record will be accessible to each of the issuers and to various candidate recipients. At this point, the record need not include actual tokens themselves. Instead, tokens may be generated according to a particular class-specific specification according to a mint function, which will be described below.

For example, at 205 one of the issuers (such as User X) may, at any time if allowed by the applicable token class specification, create new tokens from a token class. The newly created tokens will conform to the applicable token class specification in that they will satisfy the parameters defined in the specification. Optionally, upon creation, the tokens may be added to the issuer's wallet at 207. In addition, a record that includes a value of the tokens, and with additional details about the transfer, will be recorded to the digital ledger at 208. In addition, at 205 the issuer may submit a request to transfer one or more class-specific tokens (e.g., "class X tokens") that follow its class-specific specifications to another user. The request will include an identifier of the recipient who is to receive the tokens, along with an amount of the tokens that should be transferred. The amount may be a number of tokens, or it may be a value, in which case the system will calculate the number of class X tokens that result in the value. In this disclosure and in the claims, we may use the terms "number", "value" or "amount" interchangeably to generally refer to a unit of measure (i.e., a number or a total value) of tokens being generated or transferred.

In response to the request, at 206 the system may validate the request by confirming that the request satisfies one or more conditions on execution. For example, if the request is a transfer request to transfer a number of tokens to another user, the system may first confirm that the requester (User X) holds a sufficient number of tokens in their digital wallet to complete the transfer. The validation step also may first require that the transferee (User Y) accept the transfer. Additional validation criteria may be used in various embodiments. If the system cannot validate the request, then the system will not execute the request (213).

Upon validation, at 208 the system will then generate such updates and ledger entries as may be required to complete the transfer. For example, the system may determine what interest is due on the tokens that are to be transferred, and if so it may update the digital wallet of the transferor to include that interest or it may write an increased value to the digital ledger indicating that the transferor holds that value of tokens. In this way, the transferor will receive all interest due, and the transferee will begin to accumulate interest after the date of the transfer. The system may then generate a ledger entry that includes the identifier of the recipient and the amount.

At 209 the system will update the record by writing the new ledger entry to the record in the ledger. Note that in the context of digital ledgers, record entries may be immutable and, if so, cannot be revised once recorded. Thus, the term "update," as used here and elsewhere in this document when referring to updating such ledger entries, is not intended to mean actually revising a ledger entry but instead writing a new ledger entry that includes the new information and a means to link it to the entry being "updated". Thus, the system can then track transfer activity by scanning the digital ledger, identifying two ledger entries with common information, and identify the new activity by comparing the two entries and identifying the information that appears on one entry but not the other.

An example transfer record entry may include information such as the following (in which the italicized words again represent variables and the non-italicized words represent the kind of information that each variable represents):

Transfer: <TransferID ID_of_transaction, address_from address of sender; address_to address of recipient, TokenClass class or kind of token, FixedPoint value of token(s) transferred>

The ledger entry generated at step 208 also will include a trustline record entry that associates a user with certain token specifications that the user will trust (and therefore accept in a transaction). The trustline record entry may be either a new trustline, or else an update to an existing trustline if one has already been created. A trustline record entry may include an identifier of the trusting entity (i.e., the truster), a class identifier indicating the class (and therefore also the class specification) of tokens that the trusting entity will accept, an expiration date indicating a time period after which the association should be considered to be expired, a maximum value of tokens that the truster will trust, and/or other information. An example trustline record entry may therefore be:

Trustline: <address_from address of truster, TokenClass kind of token, FixedPoint value of token(s) transferred, Exp_Date expiration date>

Many of the operations performed may be parametrized by a token class. In many cases, other token classes can be used instead of the specified token class. The token classes which can be used in place of the specified token classes must be greater than or equal to the specified token class. For example, in any situation in which a token class (class A) is required, then any other token class (class B) that is comparable and greater than or equal to token class A will be considered sufficient.

The greater than or equal to relation over all token classes determines a semi-lattice structure, which may be stored in a data set and accessed for determining which token classes are greater than or equal to others, or computed as needed if not already stored. Not all token classes are comparable, i.e., token class A is not>=token class B and token class B is not>=token class A.

The system may consider two token classes to be comparable if they are created by the same user ID and all the parameters of token class A are greater than or equal to the respective parameters of token class B. If any parameter of class A is less than the same parameter of class B, then either B is not greater than or equal to A or they are not comparable. The system may resolve the question of whether parameters are equal by comparing their values (for example, does one class have a higher interest rate or earlier maturity date than the other), or by comparing characteristics having ranked priorities in a lookup table or other reference set (which may be used, for example, with parameters that do not have numeric values but instead have values such as {true/false}).

Optionally, the ledger entry generated at step 208 may also include a futureline record entry that identifies a particular future event, upon the occurrence of which a user will accept tokens of a specified token specification. The trustline function (as described above) is used to specify that a particular user (the trustor) takes on the obligation to accept tokens corresponding to a particular (or optionally greater than or equal to) token class specification as the original issuer (with both required and optional limits to the obligation as specified in the trustline function). In comparison, a futureline record entry is used to specify that a particular user will take on the obligation to accept tokens corresponding to a particular (or optionally greater than or equal to) token class specification—but only at or after a particular date and if one or more optionally specified conditions occur. The obligation can be limited up to a certain number of tokens, up to a certain percentage of tokens of the specified token class held on a particular date in any wallet, at a specified ratio of acceptance (i.e., each token will be counted as a factor of r original token where, 0<r<=1), and it can have an expiration date. Optionally there can be conditions that activate the obligation and a time after the condition is met that the obligation is activated. A futureline record entry may include an identifier of the user who will accept the token upon occurrence of the condition, a class identifier indicating the class (and therefore also the class specification) of tokens that the user will accept, a description of the future event that must occur, and optionally other information. Example futureline events include bankruptcy, a catastrophic event (such as an event against which others may have insurance), a maturity date, or other events. An example futureline record entry may therefore be:

Futureline: <address_from address of user, TokenClass kind of token, FutureEvent value event which must occur for the condition to be satisfied>

Figure 2C:
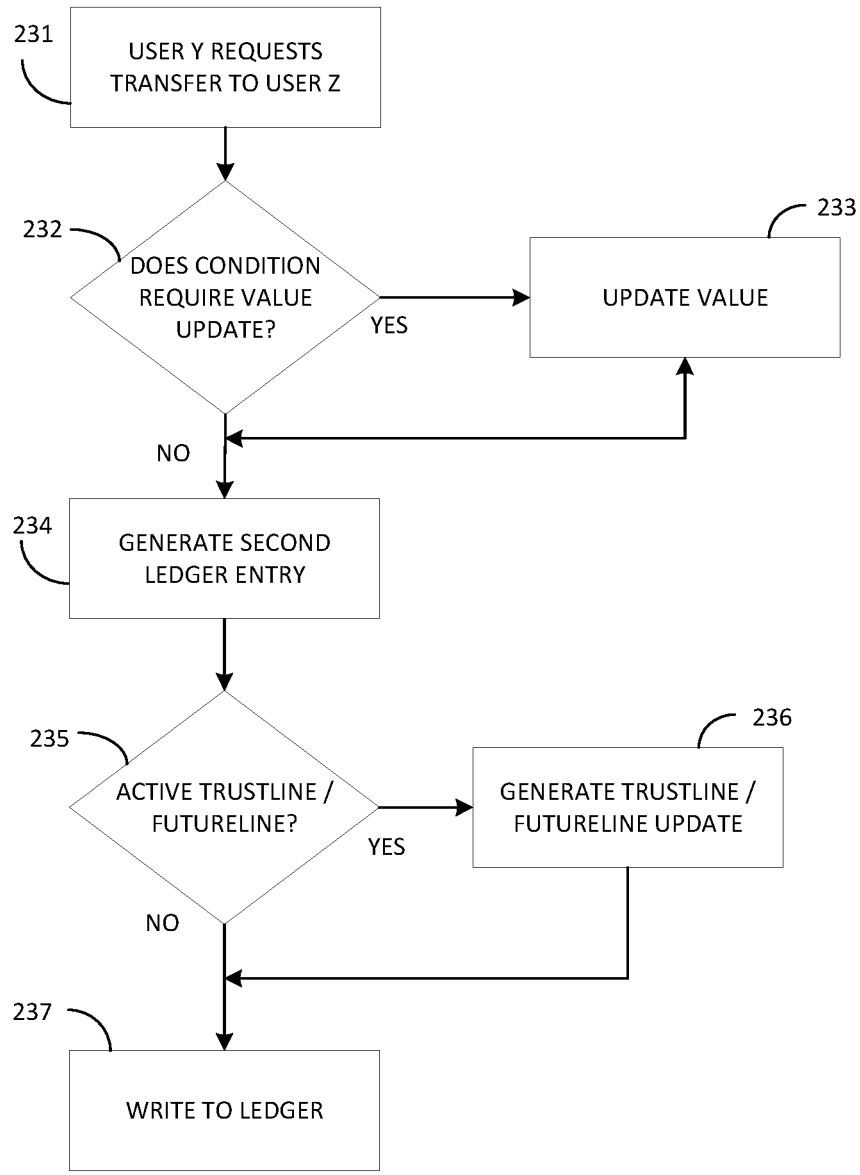

Once a user has received tokens in the system or minted new tokens according to a specification, that user may transfer some or all of the tokens to another user of the platform. This is illustrated in FIG. 2C as step 231, in which the system receives a transfer request from a one token recipient (User Y) to another token recipient (User Z). The request will include an identifier for the recipient, along with a portion of User Y's tokens to be transferred, which may be the entire amount or less than the entire amount that User Y has received. In response to this request, at 234 the system will generate a second ledger entry that includes the identifier of the second recipient (User Z) and the amount to be transferred. The system will write the second entry to the digital ledger at 237. However, before doing this, at 235 the system may determine whether the tokens being transferred are of a class that has an associated active trustline (or futureline) that identifies User Z as an establishing entity. An active trustline (or futureline) is one that has not expired and still has a remaining number of tokens that User Z is obligated to accept. If there is an active trustline or futureline (235: YES), then at 236 the system will update the active trustline (or futureline) to account for the transfer, and at 237 will write the updated trustline or futureline to the digital ledger.

Optionally, before generating the second ledger entry, upon receipt of a transfer request, or at any time prior to receipt of a request, at 232 the system may determine whether a condition has been satisfied that requires an update to the value of any tokens that are included in the portion, before the portion is transferred. For example, as with the process described above in step 208, at this step the system may determine what interest is due on the tokens that are to be transferred. If interest is due, then at 233 the system will update the digital wallet of the transferor to include that interest.

In addition, the system may support functions that allow users to create different kinds of delegation records on the ledger that allows one user (the delegator) of the system to grant to another user or users (the delegatee/s) on the system the ability to act in some capacity for the delegator by performing an operation with one or more of the delegator's tokens. For example, a delegator can grant another user the authority to create up to a maximum number of tokens of a specific token class with an optional expiration date. A delegator can grant another user the authority to accept tokens of a specific token class (or any token class greater than or equal to the specified token class) with an optional expiration date and an optional maximum number of tokens. A delegator can grant another user the authority to transfer up to a maximum number of tokens of a specific token class (or any token class greater than or equal to the specified token class) with an optional expiration date. Similar delegations of authority can be set for other functions, such as the offer/exchange/acceptoffer/revoke exchange functions, which will be discussed below. The delegator can also create a delegation record that modifies an already created delegation record which allows them to extend, limit, or cancel the delegated authority.

When a valid delegation record exists for a user (the delegatee), then when the delegatee exercises its authority by performing the delegated operation the system will check the limits imposed by the delegation record and verify that the limits are met. If (and only if) they are met, the system will allow the delegated operation to go through and will update the ledger accordingly.

Figure 2D:
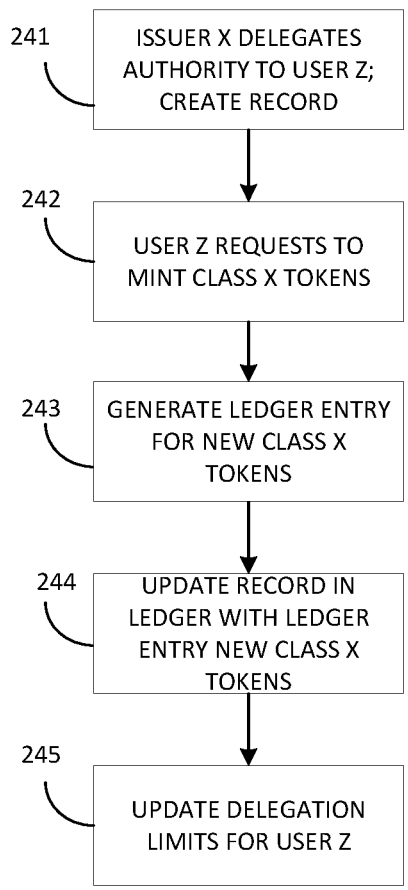

For example, FIG. 2D illustrates that at 241 an issuer (Issuer X) may submit a delegation permission to another user (User Z), and the system may create a delegation record for this. For example, the delegation record may permit User Z to mint one or more new class X tokens according to Issuer X's class-specific specification. The delegation of authority may include limits on the total number or value of the tokens that User Z can mint, an expiration date on User Z's authority to mint tokens. The limits will permit a controlling authority to allocate limited authority to others—such as a corporate headquarters delegating limited authority to affiliates and/or franchisees.

User Z may then submit a request to mint one or more new class X tokens (at 242) with a value for the new token. The system will confirm whether it has a delegation record from Issuer X that permits User Z to mint the tokens, and if so at 243 it will generate a ledger entry for the new token which User Z requested. For example, the system may send a service call such as the Mint API using the format: Mint (Address sender, Address token-class, Amount number), where sender is the unique identifier of the user performing the Mint operation, token-class is the unique identifier of the token-class specification on the ledger which determines the token class of the tokens being created, and number specifies the number of tokens being created. The sender must either be the same as the issuer of the token-class specification or a user who has a valid mint delegation from the issuer of the token-class specification.

At 244 it will then update the record for Issuer X's class-specific specification to include the new ledger entry. The information included in the update must comply with the Issuer X's class-specific token specification. At 245 the system will update the delegation information for User Z by reducing the remaining limit of Class X tokens that User Z may mint and writing that reduced limit to the digital ledger.

In addition to delegating authority to mint new tokens as shown in FIG. 2D, as noted above the system may offer an issuer the ability to delegate authority to accept, redeem, buy back or otherwise transact using tokens using the same process as is shown in FIG. 2D.

Delegation minting authority can be used to create a system-wide token class with a single token class specification which can be used as the basis for creating more tokens of that class which are indistinguishable to users of the system, but with accountability. In other words, a central organization can create a token class specification and delegate minting authority (with limits) to other users. Those other users can then mint tokens of such a token class and transfer them to third parties. The system keeps track of how many tokens each delegatee has minted, thus allowing audits. An example application of such a system is in a merchant point-of-sale system that includes multiple point-of-sale (POS) terminals (such as 105*a* in FIG. 1). In such a situation, each POS terminal is delegated (either to the device or its operator) the authority to accept token classes that the central organization (such as store management) has deemed it will accept. Delegation could also allow a central organizer to establish a policy for creating gift cards. which it then delegates to franchises or branches having card dispensing devices or card readers that are equipped with the capability of adding value to the cards.

Figure 2E:
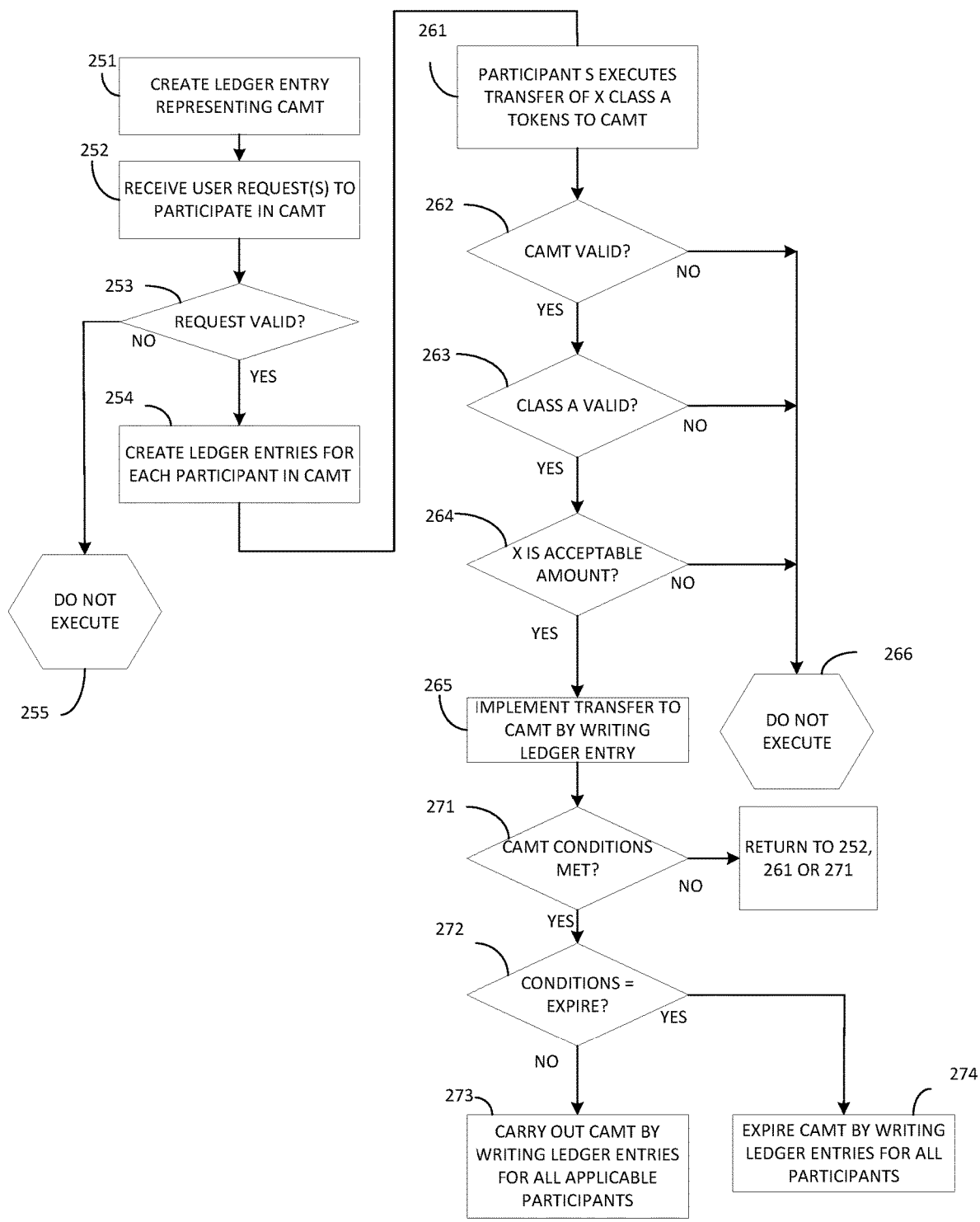

FIG. 2E illustrates that the digital ledger protocol may enable creation of an record of a conditional and atomic multi-party transaction (CAMT) which allows the transfer of tokens of a particular token class (referred to as payout-tokens) to multiple participants upon the occurrence of or more specified conditions. The conditions can include, for example, a minimum commitment of tokens of a particular from multiple users. (For example, a commitment to perform a service, or to transfer funds to others, if multiple users collectively provide at least a minimum amount of tokens as payment for the service or transfer.) If the commitment is not met within a specified timeframe, the CAMT will expire and the tokens will be returned to the participants who originally supplied them. If the comment is met, then the system will implement the transaction by distributing the tokens to all participants (or at least all participants who are designated as recipients in the CAMT.

So, referring to FIG. 2E, at 251 the system will create a digital ledger entry that defines the CAMT, which many include for example the token class for the payout-tokens if the CAMT is executed, an expiration date which if reached will nullify the CAMT if the conditions for fulfillment have not been reached, a set of commitment token classes that are acceptable for participating in the CAMT, and minimum conditions needed to execute the CAMT. The system may create the CAMT ledger entry based on information received from a user. Users may then subscribe to the escrow requesting to participate in the CAMT at 252, for example by depositing tokens from their wallet from token classes that are allowed into the CAMT using a depositCAMT function of the system (step 261). The system may first check to determine whether the request is a valid request at 253, for example by confirming that the user has not already subscribed to the CAMT or that the user satisfies certain conditions specified in the ledger entry (such as depositing a minimum number of tokens). If the request is not valid (253: NO), then the user will not become a participant in the CAMT. However, if the request is valid (253: YES), then the system may create a ledger entry for the participant.

If the participant has not yet transferred tokens to the CAMT, or if the participant wants to execute a transfer of additional tokens to the CAMT, then it may receive a request from the user (referred to as User S in FIG. 2E) to transfer tokens to the CAMT at 261. At 262 the system may scan the digital ledger to confirm that record entries indicate that the CAMT is valid (i.e., that no conditions exist that would expire the CAMT, and/or that any applicable CAMT specifications have been satisfied). For example, whenever a depositCAMT function executes, if the number of tokens being deposited would exceed the commitment of the CAMT, then only the amount that would bring the total in the escrow to the commitment number will be deposited, the rest will remain in the wallet of the requesting part. At 263 the system may similarly scan the ledger to confirm that token Class A is valid using a process similar to that discussed above in step 225b of FIG. 2B. At 264 the system may determine whether X is an acceptable amount by confirming that X is greater than zero and less than a maximum value of Class A tokens that exist, and/or less than a maximum value of tokens that the escrow specification indicates that the escrow will accept. If the system determines that the results of steps 262-264 are all YES, then the system may implement a transfer to the CAMT by generating and writing to the digital ledger a ledger entry indicating that the escrow has acquired X tokens of Class A (step 265). Otherwise, if the results of any of steps 252, 253 or 254 is NO, then the system may not generate the ledger entry, and the escrow transaction will thus not be executed (step 266).

After a depositCAMT function is completed and at any time thereafter, at 271 the system may determine whether the conditions for completion or expiration of the CAMT are met. If the conditions are not met (271: NO), then no actions will be taken until the system receives a request from a new candidate participant (at which point it will return to step 252), receives a request from an existing participant to further fund the CAMT (at which point it will return to step 261), or repeats another condition check (step 272). Additionally, at any time a function may be called to check whether the conditions of the CAMT have been met or if the CAMT has expired If the conditions are met (272: YES) and are expiration conditions (for example, if a threshold date has passed and the minimum level of tokens has not been received) (272: YES), then at 274 the system will expire the CAMT by writing ledger entries indicating that all of the tokens of the CAMT have been returned to the wallets from whence they originated. If the conditions are met (272: YES) and are not expiration conditions, then the tokens of the CAMT will be distributed among some or all of the participants. For example, some tokens may be transferred to the issuer of the CAMT function, and payout-tokens may be transferred to the wallets of all the participants as pro-rated by the number of tokens they deposited into the CAMT. In the former, the subscriber's tokens will be transferred to the issuer CAMT function and the payout-tokens will be transferred to the wallets of all the depositors as pro rated by the number of tokens they deposited into the CAMT.

It is notable that unlike physical transactions, this process does not deposit any tangible tokens into any actual accounts. Instead, as will be described below this will merely (if verified) write a record to a digital ledger indicating that a transfer to or from the CAMT occurred. Tokens transferred into the CAMT are locked into the CAMT until either the CAMT successfully executes or expires.

As noted above, the system may allow issuers to create more than one specification, in which the different specifications include different interest rates, maturity rules, buyback dates, or other details. For example, an issuer may create Specification A, in which tokens have a 1% interest rate with a maturity date of 2 years, and Specification B, in which tokens may have a 2% interest rate with a maturity date of 1 year. The issuer will inherently trust both Specifications because that issuer created them. In addition, a user who is not the issuer may cause the system to generate a trustline entry indicating that the user will trust Specification A, Specification B or both.

As noted above in FIG. 1, the system may include a data set of digital wallet information 108. This information may be accessed by users via a wallet application that is installed on the user's device and/or served to the user's device via a server. The wallet application is one of the ways that a user can interact with the ledger. The wallet allows a user to authenticate to the system and, once the user is authenticated, the system will cause the user's device to display to the user all of the tokens that the user holds in its wallet as well as any information the system is storing for the user (e.g., what escrow transactions, what trustlines, futurelines, etc. the user is participating in). The user can use the wallet application to initiate smart contracts related to buying, selling, transferring, destroying, issuing, minting, buying back, etc. tokens and, or creating token class specifications. The user can also find and locate other users on the system which are participating in the system, e.g., users who will accept tokens, etc. Users can search for other users who are on the system using a plurality of search and filter terms. The user wallet application interacts with a backend server which can store local copies of the ledger data to enable low latency communication operations. Users can initiate, accept, or cancel transactions (before they are committed to the ledger or accepted by opposing parties) on the wallet application.

Campaign information also may be available to view via the wallet application or on a website (referenced by a URL stored in a token specification) that is signed by the campaign author's private key (as per the registration method above). The wallet application will have an indicator that the campaign and its associated token specification are verified. The webpage holding the campaign information will have a section, demarked for example by appropriate HTML, data tags, which indicate what was signed by the private key so applications other than the system's wallet can verify the information by fetching the web page, parsing it, collecting the data marked by the HTML data tags, then hashing it, along with the token specification identifier to obtain the cryptographically secure signature. The signature (or some other human readable version of the same, e.g., a QR code, etc.) can be then attached to the campaign, or shown along with the campaign on the wallet, or stored in the server so that a positive indicator indicating that the campaign and the user who created it are the same as the user whose token specification is referenced are one and the same.

The wallet application also allows multiple identities to be stored on a single device. The user can use one click to change the identity that is active. The main purpose of this function is to facilitate delegation and anonymity. An example of this will be illustrated in FIG. 3, which will be discussed below.

The system may support an exchange marketplace to allow users of the system to offer tokens they hold for sale (the seller) in exchange for tokens of another token class at a particular ratio. These offers can have an optional expiration date. When tokens are offered for exchange they are locked on the ledger and cannot be used for other purposes until either the offer is revoked or the expiration date has been reached. During the period of time they are locked, they continue to earn interest if the token class specification for the tokens on offer have an attached interest rate. An offer of exchange can be made that lists a plurality of other token classes and associated ratios specified. Optionally, the offerExchange_record can be generated and used to indicate if a partial exchange can be accepted.

Any other user of the system (the buyer) can activate the exchange by executing an acceptOffer function on the ledger for any tokens of the appropriate (or greater than or equal to) token classes that match an outstanding and active offer that the user holds in a wallet they have authority over.

When the buyer activates the exchange, the number of tokens specified in the offerExchange record issued by the issuer of the offerExchange_that are locked will be deposited into the wallet of the buyer and removed from the wallet of the seller as per the ratio of the exchange and the number of tokens the buyer indicates. Atomically, the appropriate number of tokens in the wallet of the seller that match the offerExchange record will be transferred to the wallet of the buyer. If the offerExchange record indicated a partial exchange was acceptable and the number of tokens used by the buyer times the ratio specified in the record is less than the number of tokens offered by the seller, then the ledger records the difference and the offerExchange remains active with the remainder of the tokens. Any interest accumulated on the seller's tokens that were exchanged will be put back into the seller's wallet. If there are remaining seller tokens left over after the atomic exchange, then the offerExchange record remains valid for the remainder of the seller's tokens.

The seller may at any time before the completion of an offerExchange issue a revokeExchange which will cancel the outstanding offer.

The ledger protocol also may support the atomic exchange of tokens from one token class (source tokens) for tokens of another token class (destination tokens) through a plurality of intermediary exchanges. The buyer places an acceptIndirectOffer operation by specifying the set of source tokens they are using to initiate the exchange and a list of the offerExchange records needed to make a complete transaction to the final offerExchange record for the destination tokens. The system checks the validity of each of the offerExchange records listed locking each one as it goes. It performs this verification and locking in ascending alphanumeric order based on the identifiers of each offerExchange record. If after a preliminary check all offerExchange records are available and the ratios of the exchanges are correct for the initial source tokens, then the system issues a lock record, listing the all offerExchange records involved in the transaction. If this record is committed to the ledger, then the system will execute each of the exchanges, updating accumulated interest rates to be deposited back in wallets of each of the issuers of the associated offerExchange's with the result that each issuer of the offerExchange involved in the multi-party trade gets the appropriate number of tokens they asked for as pro-rated by the initial offer and the ratios of the exchanges.

If the record cannot be committed to the ledger (because one of the offerExchange records was used up before the final commitment could be made), then the transaction fails and nothing happens.

The wallet software can programmatically construct acceptIndirectOffer transactions by inspecting the ledger on the behalf of a potential buyer.

The ledger includes records that are the result of the following:

A issued an offerExchange of N X-tokens for M Y-tokens; B issued an offerExchange of P Y-tokens for Q Z-tokens; and C issued an offerExchange of R W-tokens for S V-tokens;

Assuming $P>=M$ and $R>=Q$ and all the offerExchanges allow partial fulfillment, then, if D issues an acceptIndirectOffer of S V-tokens for R*P/Q*N/M X-tokens, then assuming no one else interferes, will result in—A holding R*P/Q Y-tokens and N-R*P/Q*N/M X-tokens-B holding R Z-tokens and P-R*P/Q Y-tokens-C holding S V-tokens-D holding R*P/Q*N/M X-tokens;

plus A holding any accumulated interest on their X-tokens, B holding any accumulated interest on their Y-tokens, etc.

The process of creating specifications, minting tokens, transferring tokens, and even expiring or destroying tokens may be implemented via API calls to the digital ledger. For example, an API call for a ledger entry to transfer tokens may be implemented as a request such as:

Transfer <address (recipient of token), kind (class of token specification), value (value of tokens)>

In the API call above, the ledger may require certain conditions such as:

Requires: value of kind ∈ sender's wallet

The conditions comprise elements of a smart contract. If the conditions are satisfied, then the system may respond to the request by executing the smart contract via a command such as:

→Transfer <sender, address, kind, value>

In addition to the ledger, as described above FIG. 1 also indicated that the system will store digital wallets for one or more users. A digital wallet is a data store that stores a user's available token data in a cryptographically secure arrangement. A wallet application is a software application for permitting access to that data to authorized users or systems in response to security conditions being satisfied. For example, if the user device has been given a copy of the owner's private key, the system may enable that user device to transact with the user via the wallet application. Similar communications can occur between wallet applications and financial institutions via API calls to the institution's transaction processing systems.

Figure 3:
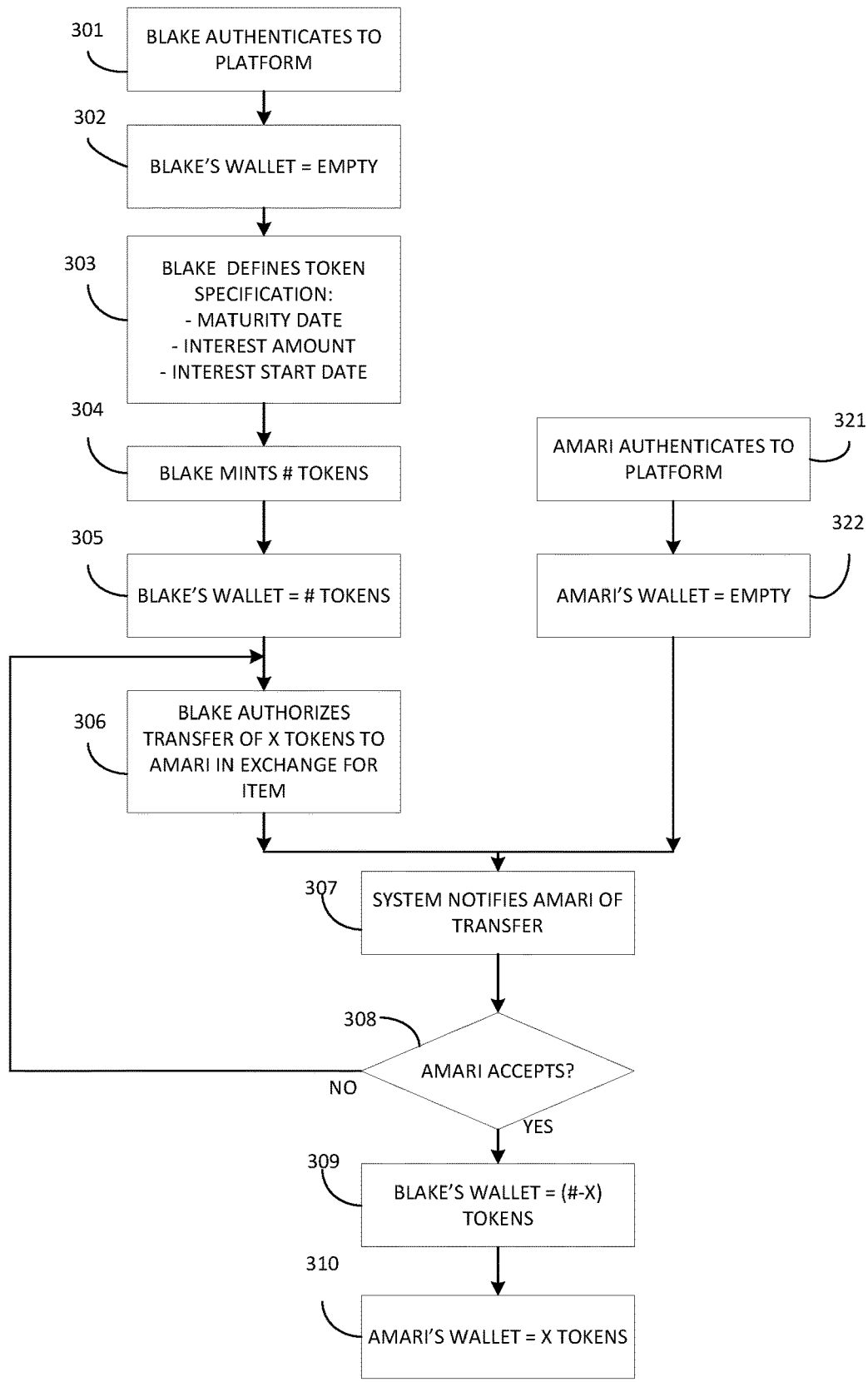
FIG. 3 illustrates a high-level overview process by which a first user of the system may define a token specification, issue tokens according to that specification and transfer the tokens to another user.

FIG. 3 illustrates a high-level overview process by which a first user of the system (referred to as Blake) may define a token specification, issue tokens according to that specification and transfer the tokens to another user (referred to as Amari). Additional details of certain aspects of the system will be described after this high-level overview. At 301 a first user (Blake) is authenticated to the platform when the system receives a username and passcode, biometric identifier, and/or other security credentials from Blake. At the start (302), Blake's wallet may contain no tokens or token specifications, and therefore Blake's wallet is empty. Similarly, at 321 Amari may authenticate to the system, and at the outset (322) Amari's wallet may be empty.

At 303 Blake defines a new token specification by entering (or by the system assigning) a maturity date, interest amount, interest start date, and/or other information. At 305 Blake may then specify a number of tokens to be created according to that specification, and at 306 the specified number of tokens will appear in Blake's digital wallet. FIG. 4 illustrates an example token specification user interface 401 that a wallet application or other application may present to an issuer such as Blake on an electronic device.

At 306 Blake may authorize the system to transfer a specified number (X) of tokens to Amari in exchange for currency or something else of value. At 307 the system will notify Amari of the transfer and wait for Amari to accept it. During this period, the application may identify the pending transaction as being in pending status unless and until Amari accepts it by actuating a button or other entry device on the user interface of Amari's electronic device. If Amari accepts the transfer, then at 308 the system will transfer the specified number of tokens to Amari's wallet (subject to verification of various conditions, which verification processes will be described in additional figures below). The result is that the specified number of tokens will be removed from Blake's wallet (309) and transferred into Amari's wallet (310).

In some embodiments, as shown in FIG. 1 the wallet data may be stored in a data set of wallet data 108 and accessed at any time. However, this is not a requirement, as when the server 101 is accessed by a user's wallet applications may prompt the server 101 to scan the digital ledger to return all ledger entries that include records of tokens that the user holds at that point in time. In addition, the server 101 may periodically, without prompting, scan the digital ledger data to return such ledger entries. Either way, the server, a user's device running a wallet application, or both can then sum the values of tokens that the user received or generated (as recorded in the ledger entries), separated by class if applicable, deduct the values of any such tokens that the user subsequently transferred, and then present the user with the real-time result which identifies the number of tokens that the user has in their wallet. Similarly, the wallet application of a potential recipient in a proposed transaction can prompt the system to scan the ledger and confirm that the transferor holds a sufficient amount of tokens to complete the transaction. In this way, each user's wallet data can be updated in real-time, with information that can be verified by both user's wallet applications without actually presenting either party with the other party's sensitive information, and without exposing the security of either user's account to another user. This information may then be saved in the wallet data set 108 and periodically updated at any point in time.

Figure 5:
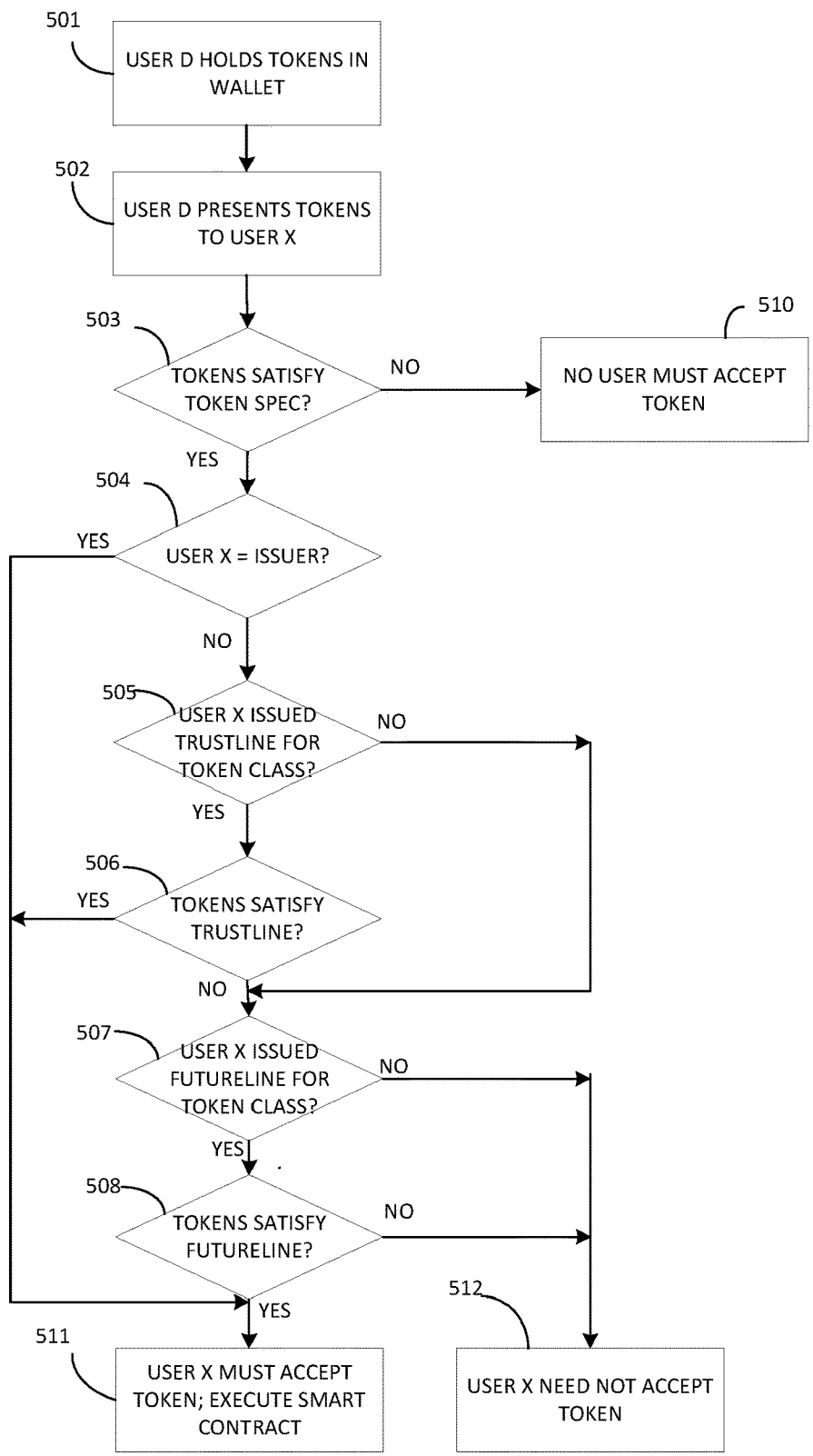
FIG. 5 is a flowchart that illustrates an example process for determining when the tokens must be accepted by one or more users.

FIG. 5 illustrates a process by which the system may automatically process smart contracts per token specifications, thus illustrating an interaction between ledger updates and wallet updates. It also illustrates a process by which the system will require an issuer (or transferor) to accept and buy back tokens that satisfy the issuer's specifications. Consider for example a situation involving four users: A, B, C and D. Presume that User A has created a specification for Class A1 tokens, User B has issued a trustline for 100 Class A1 tokens, and User D holds 50 Class A1 tokens in User D's wallet (501).

When User D presents the tokens to one of the other users (referred to here generically as "User X") at 502, the system will examine the applicable specifications and trustline entries to determine whether to cause User X to accept and buy (or buy back) the tokens. In particular, at 503 the system may first (or at any point in the process) assess whether the tokens satisfy one or more requirements of the original issuer's token specification. If the tokens do not satisfy the specification (503: NO), then the system will not require any user to accept the token (510). For example, in the scenario above if User D presents Class A1 tokens but they have not yet matured, then the system will not require any user to accept the tokens.

If the tokens satisfy the token specification (503: YES) and User X is the original issuer (504: YES), then the system will require User X (the original issuer) to accept the tokens and will automatically execute the smart contract transaction (507). Otherwise, the system may assess whether User X has issued a trustline for the token class (505), and also whether the tokens satisfy conditions of the trustline (506) such as that they not exceed a maximum value or expiration date.

If User X issued a trustline (505: YES) and the tokens satisfy the trustline's conditions (506: YES), then the system will require User X to accept the tokens and will automatically execute the smart contract transaction (510). Otherwise, the system will not require User X to accept the tokens (512) unless other conditions apply such as those described below in steps 507 and 508. However, even if the system does not require User X to accept the tokens, it may offer User X the opportunity to acquire the tokens, in which case it will execute the transaction if and only if User X indicates acceptance.

As with trustlines, the system may assess whether User X has issued a futureline for the token class (507), and also whether the tokens satisfy conditions of the futureline (508) such as that they not exceed a maximum value or expiration date. If User X issued a futureline (507: YES) and the tokens satisfy the futureline's conditions (508: YES), then the system will require User X to accept the tokens and will automatically execute the smart contract transaction (510). Otherwise, the system will not require User X to accept the tokens (512) unless other conditions apply such as those described above in steps 505 and 506.

Thus, with the process illustrated in FIG. 5, the system will automatically execute transactions for (and require users to accept) tokens that the applicable user has either issued or trusted, so long as the tokens meet the applicable specifications.

Figure 6:
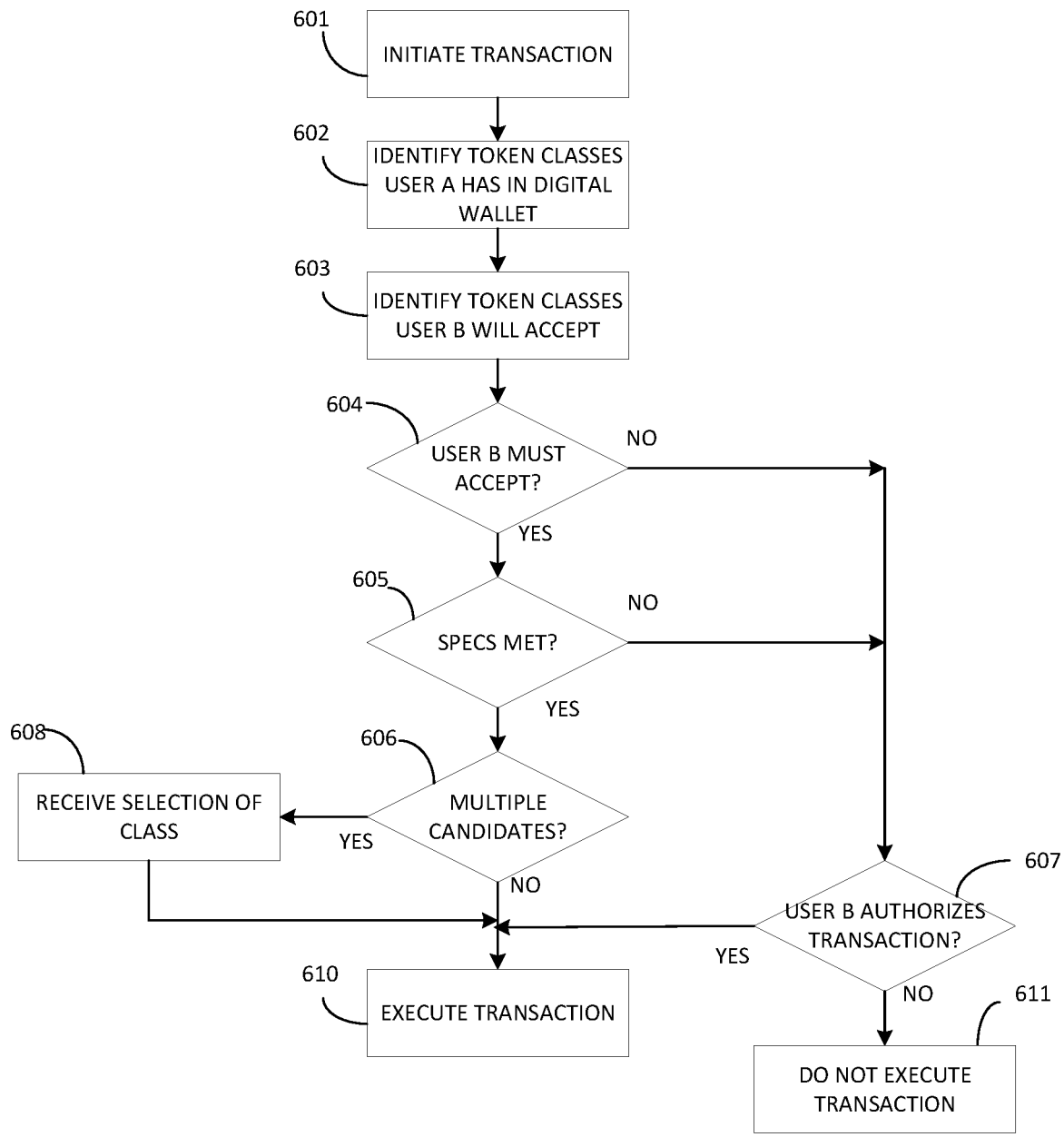
FIG. 6 is a flowchart that illustrates an example process for determining when the system will automatically execute upon a smart contract.
Figure 7:
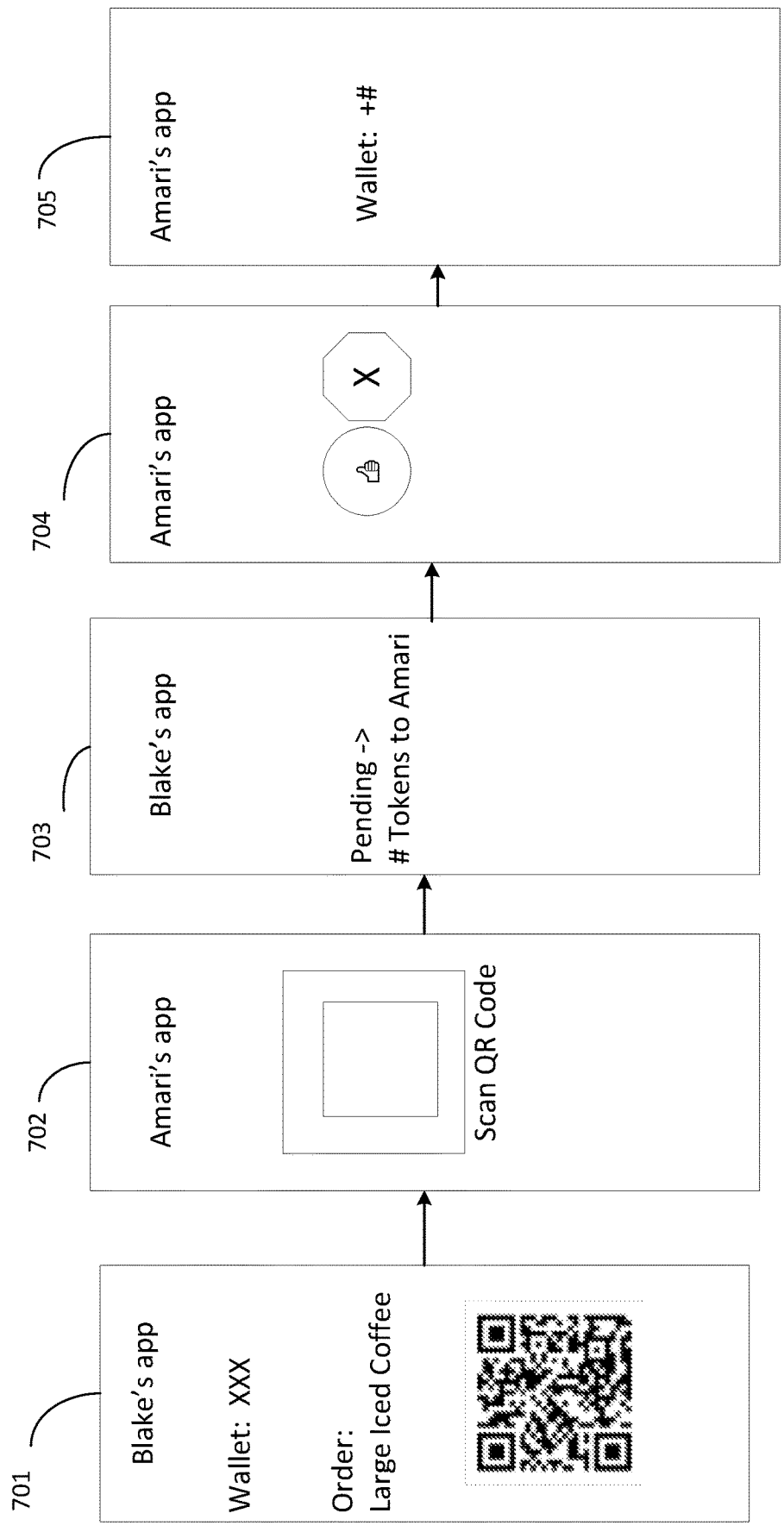
FIG. 7 illustrate example user interface screens of a token transfer process using electronic devices that provide the function of point of sale terminals.

Optionally, any user of the system may transact using any of multiple classes of tokens in the platform. If so, referring to FIG. 6, such a user (referred to here as "User A") may initiate a transaction (601) by presenting a transaction card or other object that the user wants to use to complete a transaction with another user ("User B"). Presentation may be to a point of sale terminal, or by entering card identifying information into an online service, by accessing the user's digital wallet or by other means. For example, referring to FIG. 7, a User A (Blake) may use a wallet application on their mobile device, which will display a user interface 701 with a code indicating that the user wants to send tokens to User B in exchange for an item of value. The User B (Amari) also may use an application with a user interface 702 that is operably connected to a camera application that will scan the code. Either of the electronic devices that include the user interface (701 or 702) may be a dedicated POS terminal that is used by a merchant, or it may be a non-specific electronic computing device. Transfer of the code between the users may initiate a transaction between them. In addition, as noted in FIG. 1, a POS terminal 105a may interface with the system by a POS system server 110. Regardless of how this happens, referring back to FIG. 6, the processing system may access User A's account or wallet to determine the classes of tokens that User A has available to complete the transaction (602). Optionally, the system may determine the classes of tokens that User B will accept (603). To do this, the system may access the digital ledger to find one or more trustline entries for User B. The trustline entries will identify token classes that User B trusts and therefore will accept.

If none of User A's available token classes must be accepted by User B (604: NO), then the system may not automatically execute a transaction between User A and User B (611). However, if at least one of User A's available token classes must be accepted by User B's acceptable token classes (604: YES) then the system will determine whether tokens that User A is offering meet the specifications at 605. The specifications may be those of the issuer's original token specification, and/or those of a trustline or futureline, using processes such as those described above in the discussion of FIG. 3. Example specifications may include a maturity date, as well as a requirement that User B have enough valid token in its digital wallet to complete the transactions.

If no tokens meet the applicable specifications (605: NO) then the system may not automatically execute a transaction between User A and User B (611). However, the system may still offer User B the opportunity to authorize the transaction and accept the tokens offered by User A. If User B authorizes the transaction (607: YES), then the system may automatically execute the transaction between User A and User B (610); otherwise (607: NO) the system may not execute the transaction (611).

On the other hand, if the tokens match and they meet the specification (605: YES) then the system may automatically execute the transaction between User A and User B (610) using the token(s) of the matching class. If the system finds (at 606) that multiple token classes both match and meet the specifications, then the system may cause an electronic device operated by User A or User B to output identifiers for the matching classes, and it may wait for the user to select one of the candidate classes. Upon receipt of a selection of a candidate class (at 608), the system may then automatically execute the transaction using that class of token (610).

Referring again to FIG. 7, upon execution of the transaction User A's application 703 may display that the status is pending, until it is complete. User B may accept the transaction by entering accepting unto User B's app 704. User B's app 705 may then display to User B that the additional tokens have been entered into User B's wallet. Although not shown in FIG. 7, User A's app may display to User A that the transferred tokens have been deducted from User A's wallet.

In the case when an initiating user (User A) does not have a token class that is acceptable to the requesting user (User B) but User A still wants to do a transaction with User B, then the system can optionally enable User A to execute a trade for a token they have in their wallet for a token that User B must accept. There are at least two ways that User A (or the wallet application on behalf of user A) can perform the exchange. User A (or the wallet application on behalf of user A) can execute an acceptOffer operation for a token of Class X such that an offerExchange record offering Class X tokens for Class Y tokens is active on the ledger and user A has class Y tokens in sufficient quantities and User B accepts Class Z tokens and X>=Z. Likewise, the user or wallet application can construct an indirectAcceptOffer to perform a similar result. Or, User A (or the wallet application on behalf of User A) can perform an offerExchange operation to create an offerExchange record on the ledger which offers a tokens of a class that A holds for tokens of a class that User B will accept and then wait for the offer to be accepted.

In order to increase the chances that such trades will be quickly accepted the system may include the feature of a bridge class of tokens. The bridge class is a highly liquid class that is likely to be in active offerExchange records for many different token classes. A suitable bridge class might be, for example, a token that is backed by local fiat currency (e.g., a stable coin).

As another example, User A (or the wallet app operated by User A) may issue an acceptOffer message for class X tokens, assuming the offerExchange is offering class X tokens for tokens of a token class that is in user A's wallet. (Or an indirectAcceptOffer can be constructed by the wallet to perform this as well.) Or, user A can post an OfferExchange for a token held in his wallet for class X tokens and wait for it to be accepted.

In some embodiments, referring back again to FIG. 1, a point of sale terminal to be used with the system may be a traditional POS terminal 105a that accepts a credit or debit card (which could be entered manually using the card numbers, swiping, near field communication, etc.) for payment. In this embodiment, a user of the system is issued a unique transaction card number which is associated with their identity on the ledger. Such a transaction card backed by the ledger would cause the backend processing for the POS system server 110 to access the digital ledger 107 or wallet data 108 directly or via an application server 101 to determine the tokens owned by the holder of the transaction card. If the user holds only one class of tokens that must be accepted by the merchant associated with the POS, then the system makes the transfer automatically (as described previously). If, however, there are a plurality of token classes held by the user that are acceptable to the merchant, then the server will initiate a communication to the user's wallet application (which may be running on or more devices such as a smartphone, terminal, etc.) asking the user to confirm which token class to use in the transaction. Once the user selects the token class, their device will communicate back to the server causing the server, if necessary, to communicate with the POS system and complete the transaction. If the user holds no token classes acceptable to the merchant, then the server can communicate with the user's wallet application asking if the user wants to initiate a trade (as described previously) and finish up the transaction using the traded tokens.

Figure 8:
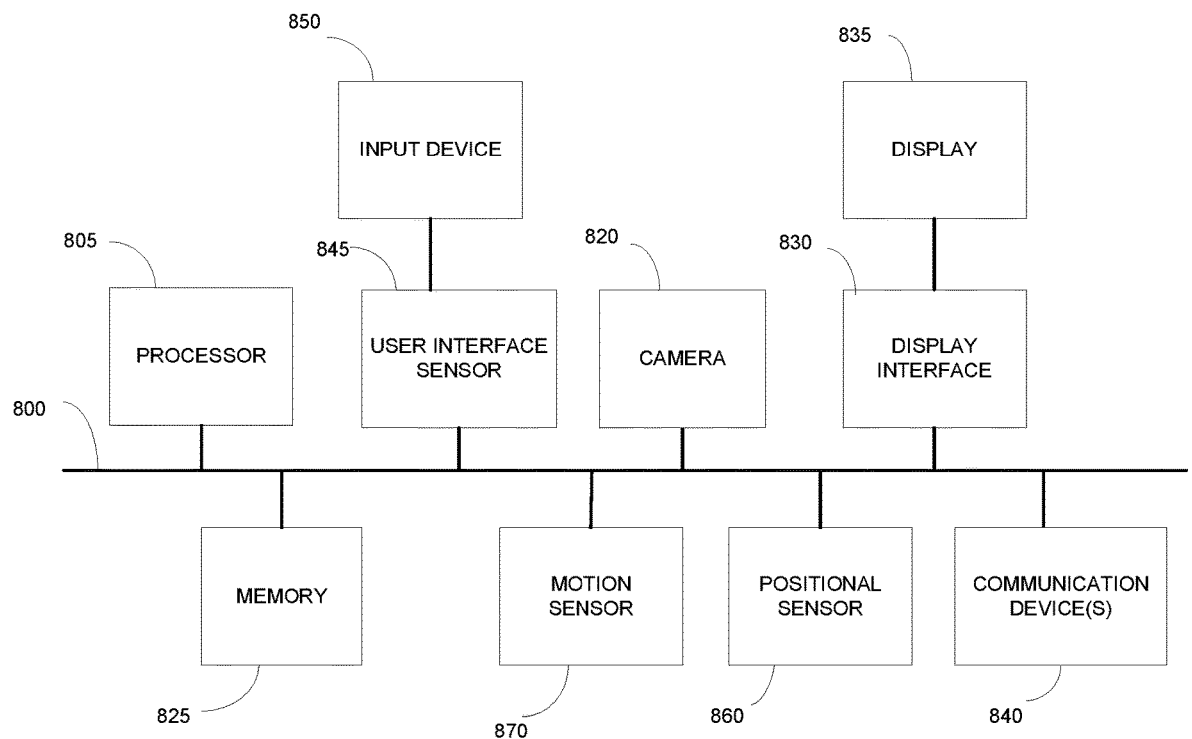
FIG. 8 illustrates example hardware elements of a server, a user electronic device, or another computing device that may be employed in the systems described in this document.

FIG. 8 depicts an example of internal hardware that may be included in any of the electronic components of the system, such as the user's smartphone or a local or remote computing device in the system. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored.

A display interface 830 may permit information to be displayed on a display device 835 in visual, graphic or alphanumeric format. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication systems. The communication device 840 may be configured to be communicatively connected to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. Digital image frames also may be received from a camera 820 that can capture video and/or still images. The system also may include a positional sensor 880 and/or motion sensor 870 to detect position and movement of the device. Examples of motion sensors 870 include gyroscopes or accelerometers. Examples of positional sensors 880 include a global positioning system (GPS) sensor device that receives positional data from an external GPS network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 8.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A "computer program product" is a memory device with programming instructions stored on it.

An "electronic ledger" or "digital ledger" is any consistent coherent data store such as a centralized or distributed database, permissioned private ledger, or a distributed public ledger, and which is accessible to multiple users of multiple electronic devices. A ledger may be public and available to anyone who can access the data store, or it may be private and secured with access restriction protocols that only permit authorized users to access the ledger. In the case of a distributed public ledger, any changes to the ledger are replicated to all users who can access the ledger. A digital ledger may contain records of transactions, smart contracts, or both between multiple users. When this document uses the term "ledger", it is intended to refer to a digital ledger.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for distributing tokens from multiple issuers to multiple recipients, the system comprising:

a processor and a computer-readable medium containing programming instructions that are configured to instruct the processor to:

detect receipt, from each of a plurality of issuers via an application programming interface, a request to generate a specification for a token class;

in response to each of the requests, generate a record for a class-specific token specification, in which each record comprises:
- an identifier that is unique to the class-specific token specification,
- a maturity date, and
- a parameter that must be satisfied for any user of the system to acquire, from another user of the system, any token that is created according to the class-specific token specification;

save each of the records for the class-specific token specifications to a digital ledger that is accessible to a plurality of users of the system;

for each of the class-specific token specifications, generate a token set comprising one or more tokens that conform to the class-specific token specification;

detect receipt, from a first user, of transfer request to transfer a first token to a second user, wherein the transfer request includes a class of the first token, an amount of the first token, and an identifier for the second user;

in response to the transfer request:
- verify that a class-specific token specification exists for the class of the first token by accessing the digital ledger and locating a token specification that corresponds to the class of the first token, and
- in response to the verifying, write one or more first ledger entries to the digital ledger, in which the one or more first ledger entries includes one or more records indicating that the amount of the first token has been transferred to the second user.

2. The system of claim 1, wherein the system provides each of the users of the system with a digital wallet application via which that user may access a digital wallet that is associated with that user, in which each digital wallet identifies, for each token class for which the user holds tokens, an amount of tokens of that token class that the user holds.

3. The system of claim 2 further comprising additional programming instructions that are configured to instruct the processor to, at any point in time, identify an amount of tokens of a specified class that any specified user holds by:
- scanning the digital ledger to extract first amounts from ledger entries indicating that the specified user has received or generated tokens of the specified class;
- scanning the digital ledger to extract second amounts from ledger entries indicating that the specified user has received or generated tokens of the specified class; and
- calculating a sum of the first amounts, and deducting the second amounts from the sum, to yield the amount of tokens of the specified class that the specified user holds at that point in time.

4. The system of claim 2, further comprising:
additional programming instructions that are configured to cause the processor to confirm that the digital wallet of the first user holds the amount of the first token by either:
- scanning the digital ledger to extract, from ledger entries indicating that the first user has received or generated tokens corresponding to the class of the first token, and calculating an amount of the tokens corresponding to the class of the first token that the first user currently holds, or
- accessing digital wallet data for the first user to identify an amount of the tokens corresponding to the class of the first token that the first user currently holds; and wherein writing the first ledger entry is also responsive to the confirming that the digital wallet of the first user holds the amount of the first token.

5. The system of claim 1 wherein the programming instructions to write the first ledger entry to the digital ledger further include instructions to write one or more of the following to the digital ledger:
- a trustline entry that indicates that the first user will accept the first token; or
- a futureline entry that indicates that the first user will accept the first token after a specified future event.

6. The system of claim 5 wherein the system includes additional programming instructions that require the first user to accept any token having a class that is greater than the class of the first token.

7. The system of claim 1, further comprising additional programming instructions that are configured to instruct the processor to, before writing the first ledger entry, access the digital ledger to find a trustline entry which confirms that the second user will accept the first token.

8. The system of claim 1, further comprising additional programming instructions that are configured to instruct the processor to:
- detect receipt, from the second user, of a request to transfer a portion of the first token to a third user, wherein an amount of the portion is less than the amount of the first token; and
- in response to the request to transfer, write to the digital ledger a second ledger entry that includes the amount of the portion, the class of the first token, and the identifier of the third user.

9. The system of claim 1, further comprising additional programming instructions that are configured to instruct the processor to:
- detect receipt, from the first user, of a buyback request that comprises an amount of a token of a first class that the first user desires to re-acquire from other users; and
- in response to the buyback request:
  - access the digital ledger to verify that a first class-specific token specification exists which corresponds to the first class of the first token,
  - verify that the first token satisfies a parameter of the first class-specific token specification,
  - scan the digital ledger to identify a set of users who hold tokens of the first class of the first token, and
  - for each of the users of the set, write to the digital ledger a ledger entry that includes a portion of the amount of the first token that is being re-acquired from that user, the first class, and an identifier of the first user.

10. The system of claim 1, further comprising additional programming instructions that are configured to instruct the processor to:
- detect receipt, from the second user, of a request to redeem the amount of the first token; and
- in response to the request to redeem:
  - access the digital ledger to verify that a class-specific token specification exists which corresponds to the class of the first token,
  - extract, from the class-specific token specification, the parameter that must be satisfied for the first user to acquire the first token, and verify that the first token satisfies the parameter and, in response, write to the digital ledger a second ledger entry that includes the amount of the first token, the class of the first token, and an identifier of the first user.

11. The system of claim 1, further comprising additional programming instructions that are configured to instruct the processor to:
upon detection of receipt of both:
from a first issuer, an authorization to permit another user of the system to perform an operation with a new token according to a class-specific specification that is associated with the first issuer, wherein the authorization includes a maximum amount, and
from the first user or the second user, a request to perform the operation with the new token according to the first issuer's class-specific specification, along with an amount for the new token that is less than the maximum amount;
then in response, write to the digital ledger a second ledger entry that includes the operation, the amount for the new token, the token class for the new token, and an identifier of the first user or the second user.

12. The system of claim 1, wherein:
the processor comprises a plurality of processors;
in the plurality of processors, the processor that is configured to execute programming instructions to detect receipt, from the first user, of the transfer request is a processor of a point of sale terminal operated by the second user; and
in the plurality of processors, the processor that is configured to verify that the class-specific token specification exists and to write the first ledger entry to the digital ledger is an application server that is in communication with the point of sale terminal via one or more networks.

13. The system of claim 1, further comprising additional programming instructions that are configured to instruct the processor to:
create and write to the digital ledger a digital ledger entry representing a conditional and multi-party transaction (CAMT);
receive, from a plurality of requesting users, requests to participate in the CAMT;
for any requesting user who is a valid requester, create a digital ledger entry indicating that the valid request is a participant in the CAMT,
receive, from one or more of the participants, a request to transfer tokens of a specified class to the CAMT;
write to the digital ledger a digital ledger entry with a record indicating that the tokens of the specified class have been transferred to the CAMT;
access the digital ledger entry to retrieve one or more conditions that will trigger execution of the CAMT, and
in response to verifying that the one or more conditions have been met:
if the one or more conditions are expiration conditions, expire the CAMT by writing digital ledger entries that reverse each participant's participation in the CAMT;
if the one or more conditions are not expiration conditions, execute the CAMT by writing digital ledger entries indicating that the tokens of the specified class are transferred to a plurality of the participants.

14. A method of distributing tokens from multiple issuers to multiple recipients, the method comprising, by a processor:

detecting receipt, from each of a plurality of issuers via an application programming interface, a request to generate a specification for a token class;
in response to each of the requests, generating a record for a class-specific token specification, in which each record comprises:
an identifier that is unique to the class-specific token specification,
a maturity date, and
a parameter that must be satisfied for any user of the system to acquire, from another user of the system, any token that is created according to the class-specific token specification;
saving each of the records for the class-specific token specifications to a digital ledger that is accessible to a plurality of users of the system;
for each of the class-specific token specifications, generating a token set comprising one or more tokens that conform to the class-specific token specification;
detecting receipt, from a first user, of transfer request to transfer a first token to a second user, wherein the transfer request includes a class of the first token, an amount of the first token, and an identifier for the second user;
in response to the transfer request:
verifying that a class-specific token specification exists for the class of the first token by accessing the digital ledger and locating a token specification that corresponds to the class of the first token, and
in response to the verifying, writing one or more first ledger entries to the digital ledger, in which the one or more first ledger entries includes one or more records indicating that the first amount of the first token has been transferred to the second user.

15. The method of claim 14 further comprising, by the processor, identifying an amount of tokens of a specified class that a specified user holds at a point in time by:
scanning the digital ledger to extract first amounts from ledger entries indicating that the specified user has received or generated tokens of the specified class;
scanning the digital ledger to extract second amounts from ledger entries indicating that the specified user has received or generated tokens of the specified class; and
calculating a sum of the first amounts, and deducting the second amounts from the sum, to yield the amount of tokens of the specified class that the specified user holds at that point in time.

16. The method of claim 14 further comprising, by the processor:
confirming that a digital wallet of the first user holds the amount of the first token by either:
scanning the digital ledger to extract, from ledger entries indicating that the first user has received or generated tokens corresponding to the class of the first token, and calculating an amount of the tokens corresponding to the class of the first token that the first user currently holds, or
accessing digital wallet data for the first user to identify an amount of the tokens corresponding to the class of the first token that the first user currently holds; and
when writing the first ledger entry, doing so also responsive to the confirming that the digital wallet of the first user holds the amount of the first token.

17. The method of claim 14, wherein the programming instructions to write the first ledger entry to the digital ledger further include instructions to write one or more of the following to the digital ledger:

a trustline entry that indicates that the first user will accept the first token; or a futureline entry that indicates that the first user will accept the first token after a specified future event.

18. The method of claim 14 further comprising, by the processor:

detecting receipt, from the first user, of a buyback request that comprises an amount of a token of a first class that the first user desires to re-acquire from other users; and in response to the buyback request:

accessing the digital ledger to verify that a first class-specific token specification exists which corresponds to the first class of the first token, verifying that the first token satisfies a parameter of the first class-specific token specification, scanning the digital ledger to identify a set of users who hold tokens of the first class of the first token, and for each of the users of the set, write to the digital ledger a ledger entry that includes a portion of the amount of the first token that is being re-acquired from that user, the first class, and an identifier of the first user.

19. The method of claim 14 further comprising, by the processor:

detecting receipt, from the second user, of a request to redeem the amount of the first token;

accessing the digital ledger to verify that a class-specific token specification exists which corresponds to the class of the first token;

extracting, from the class-specific token specification, the parameter that must be satisfied for the first user to acquire the first token; and verifying that the first token satisfies the parameter and, in response, write to the digital ledger a second ledger entry that includes the amount of the first token, the class of the first token, and an identifier of the first user.

20. The method of claim 14 further comprising, by the processor:

upon detection of receipt of both:

from a first issuer, an authorization to permit another user of the system to perform an operation with a new token according to a class-specific specification that is associated with the first issuer, wherein the authorization includes a maximum amount, and from the first user or the second user, a request to perform the operation with the new token according to the first issuer's class-specific specification, along with an amount for the new token that is less than the maximum amount;

then in response, writing to the digital ledger a second ledger entry that includes the operation, the amount for the new token, the token class for the new token, and an identifier of the first user or the second user.

21. The method of claim 14, wherein:

the processor comprises a plurality of processors;

the processor that detects receipt, from the first user, of the transfer request is a processor of a point of sale terminal operated by the second user; and the processor that verifies that the class-specific token specification exists and writes the first ledger entry to the digital ledger is an application server that is in communication with the point of sale terminal via one or more networks.

22. The system of claim 1, wherein the programming instructions are also configured to, in response to the verifying:

determine a first amount of accumulated interest due to the first user on the amount of the first token held by the first user at the time of the transfer request, and when writing the first ledger entry one or more first ledger entries to the digital ledger, indicate that, prior to transferring the amount of the first token to the second user, the first user held the amount of the first token plus the first amount of accumulated interest.

23. The system of claim 1, wherein the programming instructions are also configured to, in response to the transfer request:

determine a second amount of accumulated interest due to the second user on an amount of the class of the first token held by the second user at the time of the transfer request; and implement one of the following:

write a second ledger entry that includes a record indicating that, after the amount of the first token was transferred to the second user, the second user held the amount of the class of the first token held by the second user at the time of the transfer request, plus the amount of the first token transferred to the second user, plus the second amount of accumulated interest; or update a digital wallet that is associated with the second user to indicate that, after the amount of the first token was transferred to the second user, the second user held the amount of the class of the first token held by the second user at the time of the transfer request, plus the amount of the first token transferred to the second user, plus the second amount of accumulated interest.

24. The method of claim 14 further comprising, in response to the verifying:

determining a first amount of accumulated interest due to the first user on the amount of the first token held by the first user at the time of the transfer request, and when writing the first ledger entry one or more first ledger entries to the digital ledger, indicating that prior to transferring the amount of the first token to the second user, the first user held the amount of the first token plus the first amount of accumulated interest.

* * * * *